United States Patent
Dalrymple et al.

(10) Patent No.: US 11,556,001 B2
(45) Date of Patent: Jan. 17, 2023

(54) MICROSTRUCTURED FIBER OPTIC OSCILLATOR AND WAVEGUIDE FOR FIBER SCANNER

(71) Applicant: Magic Leap, Inc., Plantation, FL (US)

(72) Inventors: Timothy Mark Dalrymple, Gainesville, FL (US); Clinton Carlisle, Parkland, FL (US); Jason Schaefer, Coral Springs, FL (US); Andrew C. Duenner, Houston, TX (US); Vaibhav Mathur, Weston, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/195,435

(22) Filed: Mar. 8, 2021

(65) Prior Publication Data

US 2021/0286171 A1    Sep. 16, 2021

Related U.S. Application Data

(63) Continuation of application No. 16/565,119, filed on Sep. 9, 2019, now Pat. No. 10,976,540, which is a continuation of application No. 15/851,330, filed on Dec. 21, 2017, now Pat. No. 10,451,868.

(60) Provisional application No. 62/464,298, filed on Feb. 27, 2017, provisional application No. 62/438,898, filed on Dec. 23, 2016.

(51) Int. Cl.
*G02B 26/10* (2006.01)
*G02B 6/02* (2006.01)
*G02B 6/00* (2006.01)

(52) U.S. Cl.
CPC ....... *G02B 26/103* (2013.01); *G02B 6/02042* (2013.01); *G02B 6/02347* (2013.01); *G02B 6/02361* (2013.01); *G02B 2006/0098* (2013.01)

(58) Field of Classification Search
None
See application file for complete search history.

(56) References Cited

U.S. PATENT DOCUMENTS

| | | | |
|---|---|---|---|
| 6,512,871 B2 | 1/2003 | Kumel et al. | |
| 6,856,712 B2 | 2/2005 | Fauver et al. | |
| 6,915,053 B2 | 7/2005 | Hasegawa | |
| 7,590,323 B2 | 9/2009 | Broeng et al. | |

(Continued)

FOREIGN PATENT DOCUMENTS

| | | |
|---|---|---|
| CN | 1205443 A | 1/1999 |
| CN | 1449504 A | 10/2003 |

(Continued)

OTHER PUBLICATIONS

IN201947021706, English Translation and "First Examination Report", dated Jul. 30, 2021, 5 pages.

(Continued)

*Primary Examiner* — Rhonda S Peace
(74) *Attorney, Agent, or Firm* — Kilpatrick Townsend & Stockton LLP

(57) ABSTRACT

Described are optical fibers and scanning fiber displays comprising optical fibers. The disclosed optical fibers include a plurality of mass adjustment regions, such as gas-filled regions, positioned between a central waveguiding element and an outer periphery for reducing a mass of the optical fiber as compared to an optical fiber lacking the plurality of mass adjustment regions.

20 Claims, 6 Drawing Sheets

(56) References Cited

U.S. PATENT DOCUMENTS

| | | | |
|---|---|---|---|
| 7,590,324 | B1 | 9/2009 | Chen et al. |
| 7,616,986 | B2 | 11/2009 | Seibel et al. |
| 7,899,294 | B2 | 3/2011 | Chen et al. |
| 8,335,421 | B2 | 12/2012 | Imamura |
| 8,537,203 | B2 | 9/2013 | Seibel et al. |
| 9,921,408 | B2 | 3/2018 | Gruhlke |
| 10,451,868 | B2 | 10/2019 | Dalrymple et al. |
| 10,976,540 | B2 * | 4/2021 | Dalrymple ......... G02B 6/02361 |
| 2004/0033043 | A1 | 2/2004 | Monro et al. |
| 2004/0047587 | A1 | 3/2004 | Osborne |
| 2004/0101262 | A1 | 5/2004 | Fleming et al. |
| 2006/0007514 | A1 | 1/2006 | Desai |
| 2007/0213618 | A1 | 9/2007 | Li et al. |
| 2008/0304800 | A1 | 12/2008 | Bickham et al. |
| 2009/0052854 | A1 | 2/2009 | Miyabe et al. |
| 2010/0021114 | A1 | 1/2010 | Chen et al. |
| 2010/0021118 | A1 | 1/2010 | Chen et al. |
| 2011/0205349 | A1 | 8/2011 | Li |
| 2015/0248787 | A1 | 9/2015 | Abovitz et al. |
| 2015/0268415 | A1 | 9/2015 | Schowengerdt et al. |
| 2016/0317228 | A1 | 11/2016 | Fermann et al. |
| 2018/0180875 | A1 | 6/2018 | Dalrymple et al. |
| 2019/0235231 | A1 | 8/2019 | Yasumi et al. |
| 2020/0004010 | A1 | 1/2020 | Dalrymple et al. |

FOREIGN PATENT DOCUMENTS

| | | |
|---|---|---|
| CN | 101061411 A | 10/2007 |
| CN | 102132178 A | 7/2011 |
| CN | 102162875 A | 8/2011 |
| CN | 102590967 A | 7/2012 |
| CN | 206026365 U | 3/2017 |
| JP | 2004020836 A | 1/2004 |
| JP | 2004177817 A | 6/2004 |
| JP | 2011529200 A | 12/2011 |

OTHER PUBLICATIONS

Application No. KR10-2019-7021332, English Translation and Office Action, dated Jul. 6, 2021, 11 pages.
U.S. Appl. No. 15/851,330, "Final Office Action", dated Nov. 9, 2018, 20 pages.
U.S. Appl. No. 15/851,330, "Non Final Office Action", dated Jun. 27, 2018, 24 pages.
U.S. Appl. No. 15/851,330, "Non-Final Office Action", dated Feb. 19, 2019, 19 pages.
U.S. Appl. No. 15/851,330, "Notice of Allowance", dated Jun. 12, 2019, 9 pages.
U.S. Appl. No. 16/565,119, "Corrected Notice of Allowability", dated Mar. 17, 2021, 6 pages.
U.S. Appl. No. 16/565,119, "Non-Final Office Action", dated Aug. 28, 2020, 8 pages.
U.S. Appl. No. 16/565,119, "Notice of Allowance", dated Dec. 9, 2020, 9 pages.
Alkeskjold, "Large-Mode-Area Ytterbium-Doped Fiber Amplifier With Distributed Narrow Spectral Filtering and Reduced Bend Sensitivity", Optics Express, vol. 17, No. 19, Sep. 14, 2009, pp. 16395-16405.
AU2017382882, "First Examination Report", dated Mar. 11, 2021, 7 pages.
CN201780079410.1, "Notice of Decision to Grant", Englished translation is not available, dated Sep. 2, 2020, 1 page.
CN201780079410.1, "Office Action", English Translation, dated Apr. 9, 2020, 8 pages.
Ducourthial, et al., "Development of a Real-time Flexible Multiphoton Microendoscope for Label-free Imaging in a Live Animal", Scientific Reports, vol. 5, Article 18303, Dec. 17, 2015, pp. 1-9.
EP17884095.5, "Extended European Search Report", dated Dec. 2, 2019, 8 pages.
JP2019-533405, "Office Action", English Translation, dated Jan. 5, 2021, 10 pages.
KR10-2019-7021332, "Office Action", English Translation is not available, dated Mar. 10, 2021, 8 pages.
Monro, et al., "Sensing with Suspended-Core Optical Fibers", Optical Fiber Technology, vol. 16, No. 6, Dec. 2010, pp. 343-356.
PCT/US2017/067973, "International Preliminary Report on Patentability", dated Jul. 4, 2019, 8 pages.
PCT/US2017/067973, "International Search Report and Written Opinion", dated May 2, 2018, 11 pages.
PCT/US2017/067973, "Invitation to Pay Add'l Fees and Partial Search Report", dated Mar. 8, 2018, 2 pages.
Ward, "Solid-Core Photonic Bandgap Fibers for Cladding-Pumped Raman Amplification", Optics Express, vol. 19, No. 12, Jun. 6, 2011, pp. 11852-11866.
Xiao, et al., "Photonic Crystal Fibers Confining Light by Both Index-Guiding and Bandgap-Guiding: Hybrid PCFs", Optics Express, vol. 15, No. 24, Nov. 26, 2007, pp. 15637-15647.
Ye, et al., "Development of a Double-Cad Photonic-Crystal-Fiber Based Scanning Microscope", Proceedings of Spie, vol. 5700, Mar. 30, 2005, pp. 23-27.
JP2019-533405, Office Action, English Translation, dated Jun. 1, 2021, 13 pages.
AU2017382882, "Notice of Acceptance", dated Dec. 14, 2021, 3 pages.
Application No. KR10-2019-7021332, Office Action and English translation, dated Nov. 24, 2021, 8 pages.
Application No. CN202011276836.6, "Office Action", dated May 25, 2022, 5 pages, [no translation available].
Application No. EP17884095.5, "Office Action", dated Jun. 15, 2022, 7 pages.
Application No. IL267414, "Office Action", dated Jun. 26, 2022, 4 pages.
Application No. JP2019-533405, "Office Action", dated Aug. 1, 2022, 9 pages, no translation available.
Application No. JP2021-157666, "Office Action" and English translation, dated Oct. 3, 2022, 4 pages.
Application No. KR10-2022-7017114, "Office Action" and English translation, dated Aug. 16, 2022, 20 pages.

* cited by examiner

MICROSTRUCTURED FIBER OPTIC OSCILLATOR AND WAVEGUIDE FOR FIBER SCANNER

CROSS-REFERENCE TO RELATED APPLICATIONS

This application is a continuation of U.S. patent application Ser. No. 16/565,119, filed Sep. 9, 2019, now U.S. Pat. No. 10,976,540, issued Apr. 13, 2021, entitled "MICROSTRUCTURED FIBER OPTIC OSCILLATOR AND WAVEGUIDE FOR FIBER SCANNER," which is a continuation of U.S. patent application Ser. No. 15/851,330, filed Dec. 21, 2017, now U.S. Pat. No. 10,451,868, issued Oct. 22, 2019, entitled "MICROSTRUCTURED FIBER OPTIC OSCILLATOR AND WAVEGUIDE FOR FIBER SCANNER," which is a non-provisional of and claims the benefit of and priority to U.S. Provisional Application No. 62/438,898, filed on Dec. 23, 2016, and U.S. Provisional Application No. 62/464,298, filed on Feb. 27, 2017, the entire disclosures of which are hereby incorporated by reference, for all purposes, as if fully set forth herein.

BACKGROUND OF THE INVENTION

Optical fibers have been employed for a variety of uses, including communication, sensors, and imaging. Optical fibers of various constructions exist and generally include a waveguide structure, such as a waveguide made of a central core and a surrounding cladding layer, with additional buffer and jacket layers optionally included to provide protection during handling or exposure to environmental conditions. Additional optical fiber designs and optimizations are needed to improve and expand the variety of applications that optical fibers are or can be employed in.

SUMMARY OF THE INVENTION

This application relates to optical waveguides. More specifically, and without limitation, this application relates to optical fibers and optical fiber oscillators, such as used for scanning fiber displays, where the optical fibers include a waveguiding element and a mechanical region with one or more mass reduction elements positioned between the waveguiding element and an outer periphery of the optical fiber. The inclusion of the mass reduction elements advantageously provide a scanning fiber display incorporating the optical fiber with an improvement to a field-of-view, such as when compared to use of conventional fiber optic oscillators.

Scanning devices generally trade off scanning range for frequency. For example, in general, as frequency increases, scanning range decreases. Similarly, as scanning range increases, frequency decreases. In many applications, such as scanning optical projectors, it is desirable, however, to have large operating frequency and large range. Frequency may be important for both resolution and refresh rate. For example, in a scanning fiber display, the frequency may directly impact the refresh rate, as the repeated oscillations of a fiber may dictate how frequently the output view can be changed.

Range, however, may be important for field-of-view for a given projector design. For example, the maximum amplitude or range of an oscillating fiber may provide for a limit on how wide an output image generated by the fiber may be. As the oscillation range is increased, a wider field of view may be provided.

Scanning devices may also be useful as display devices due to their small form factor and useful resolution and field-of-view. However, in order to obtain high frequency scanning devices with a high scanning range, innovations in this field are required. The presently described optical fibers allow for improved field-of-view projectors while maintaining a small form factor. As an example, by incorporating the disclosed optical fibers into a scanning fiber display projector, the field-of-view of the projector may be increased relative to conventional scanning fiber display devices.

In a first aspect, provided are optical fibers. The disclosed optical fibers may also be referred to herein as microstructured optical fibers. Example optical fibers include those comprising a waveguiding element extending along an axis; a mechanical region surrounding the waveguiding element, such as a mechanical region that is positioned between the waveguiding element and an outer periphery and that comprises a first material having a first density; and a plurality of mass adjustment regions positioned within the mechanical region, such as a plurality of mass adjustment regions that comprise a second material having a second density less than the first density. Such mass adjustment regions may optionally comprise air or may correspond to regions where material is removed or otherwise absent from the mechanical region. It will be appreciated that the first and second materials may also have different optical properties, such as different indices of refraction.

As another example, the disclosed optical fibers include optical fibers comprising a waveguiding element extending along an axis; a mechanical region surrounding the waveguiding element, such as a mechanical region that is positioned between the waveguiding element and an outer periphery and that comprises a first material; and a plurality of second moment of area adjustment regions positioned within the mechanical region, such as a plurality of second moment of area adjustment regions that serve to modify the overall second moment of area of the mechanical region as compared to an identical optical fiber except that a corresponding mechanical region of the identical optical fiber does not include second moment of area adjustment regions positioned between a corresponding waveguiding element and a corresponding outer periphery of the identical optical fiber. As an example, second moment of area adjustment regions may exhibit different mass per unit cross-sectional area than that of the first material and result in modification of the overall second moment of area of the mechanical region. As a further example, second moment of area adjustment regions may exhibit different densities than that of the first material and result in modification of the overall second moment of area of the mechanical region. It will be appreciated that the term second moment of area refers to a geometrical property of an area or object, as is known in the field of mechanical engineering, and that other terms may be used interchangeably for second moment of area, including area moment of inertial, second area moment, and moment of inertia of plane area.

A variety of waveguiding elements are useful with the optical fibers described herein. A waveguiding element may comprise a central core region and a cladding layer surrounding the central core region. Optionally, the central core region has a diameter of about 5 μm to about 25 μm. Optionally, the cladding layer has a diameter of about 5 μm to about 200 μm. Optionally, the cladding layer comprises the first material. Optionally, the central core region comprises a third material. Optionally, the central core region comprises the second material. Optionally, the cladding layer comprises a third material. Optionally, the cladding layer and the mechanical region comprise a unitary body. For example, the mass adjustment regions may optionally be positioned within or as part of the cladding layer.

Optionally, the waveguiding element corresponds to a single mode waveguiding element or a multimode waveguiding element. Other useful waveguiding elements include those comprising a plurality of core regions and a cladding layer surrounding the plurality of core regions. Optionally, each of the plurality of core regions may be the same or different materials. Other waveguiding elements are contemplated, including those comprising a hollow (i.e., evacuated) or gas- or air-filled region, such as a gas-filled core region. It will be appreciated that hollow or gas- or air-filled cores may be useful in high power applications as gas or air may absorb less energy than glass or another solid material. Optionally, evacuated regions (i.e., vacuum filed regions) may also be utilized. It will also be appreciated that core and cladding regions may exhibit different optical properties, such as different indices of refraction.

A variety of mass adjustment regions may be employed with the optical fibers described herein. For example, the mass adjustment regions may include, but are not limited to, one or more gas- or air-filled regions, one or more polymer-filled regions, one or more glass-filled regions, one or more evacuated regions, or any combination of these. As an example, the mechanical region may comprise a first glass and the mass adjustment regions may comprise a second glass that is different from the first glass. Optionally, the plurality of mass adjustment regions comprises a plurality of rows of mass adjustment elements. For example, the plurality of rows may be arranged concentrically around the central waveguiding element. Optionally, the plurality of mass adjustment regions are arranged in a symmetric configuration around the axis. Optionally, each of the plurality of mass adjustment regions has a circular cross-sectional shape, an oval cross-sectional shape, or a polygonal cross-sectional shape. Combinations of cross-sectional shapes may also be utilized. Optionally, each mass adjustment region has a cross-sectional shape with a lateral dimension or a diameter of about 1 µm to about 25 µm. Optionally, the plurality of mass adjustment regions traverse a length of the optical fiber, such as where each mass adjustment region has its own longitudinal axis. Optionally, each longitudinal axis is arranged with axes parallel to the axis of the optical fiber. Other configurations are possible, including where individual cells or regions of mass reduction material are included in sections of the optical fiber. The mass adjustment regions may optionally run the entire length of the optical fiber, or only a portion of the fiber. Alternatively, the mass adjustment regions are randomly or evenly distributed throughout the mechanical region, or run perpendicular to or angled from an optical or waveguide axis. Optionally, a pitch between the plurality of mass reduction regions is about 1 µm to about 25 µm. Optionally, the plurality of mass adjustment regions occupy between about 30% and about 90% of a volume of the mechanical region. Such a fractional or percentage volume may be referred to herein as a mass reduction fraction or mass reduction filled fraction. In the case of a mass reduction region comprising air or gas, such a fractional or percentage volume may be referred to as an air-filled fraction or gas-filled fraction.

Optionally, the optical fiber comprises a composite optical fiber having a plurality of different cross-sectional configurations. For example, the optical fiber may comprise a first segment comprising a first cross-sectional configuration and a second segment comprising a second cross-sectional configuration. In this way, an optical fiber may comprise a segment that is microstructured and a segment that is not microstructured. Segmented optical fibers may be manufactured as a single fiber with a varying cross-sectional configuration. Segmented optical fibers may also be constructed by splicing optical fibers of different cross-sectional configurations.

It will be appreciated that inclusion of mass-reduction regions may allow for selection, tuning, or otherwise modifying the mechanical properties of an optical fiber. For example, an outside diameter of the optical fiber may be proportional to a pointing angle of the optical fiber. Optionally, a mass adjustment filled fraction of the mechanical region is proportional to a pointing angle of the optical fiber. Optionally, the mass adjustment filled fraction is represented by a ratio of a diameter of the mass adjustment regions to a pitch between the mass adjustment regions.

It will be appreciated that the plurality of mass adjustment regions may reduce a mass of the optical fiber per unit length as compared to a comparable optical fiber comprising a corresponding waveguiding element that is identical to the waveguiding element and a corresponding mechanical region that is identical to the mechanical region except that the corresponding mechanical region does not include mass adjustment regions positioned between the corresponding waveguiding element and a corresponding outer periphery of the comparable optical fiber.

Optical fibers may exhibit an effective cantilever length. Optionally, the plurality of mass adjustment regions increases a resonant oscillatory frequency of the optical fiber as compared to a comparable optical fiber having the effective cantilever length and comprising a corresponding waveguiding element that is identical to the waveguiding element and a corresponding mechanical region that is identical to the mechanical region except that the corresponding mechanical region does not include mass adjustment regions positioned between the corresponding waveguiding element and a corresponding outer periphery of the comparable optical fiber. Optionally, the plurality of mass adjustment regions increases an effective cantilever length of the optical fiber for a given operating or resonant frequency as compared to a comparable optical fiber comprising a corresponding waveguiding element that is identical to the waveguiding element and a corresponding mechanical region that is identical to the mechanical region except that the corresponding mechanical region does not include mass adjustment regions positioned between the corresponding waveguiding element and a corresponding outer periphery of the comparable optical fiber.

Optical fibers, such as those having an effective cantilever length, may have a resonant frequency. Optionally, the plurality of mass adjustment regions increases an effective cantilever length of the optical fiber as compared to a comparable optical fiber having the resonant frequency and comprising a corresponding waveguiding element that is identical to the waveguiding element and a corresponding mechanical region that is identical to the mechanical region except that the corresponding mechanical region does not include mass adjustment regions positioned between the corresponding waveguiding element and a corresponding outer periphery of the comparable optical fiber.

In another aspect, scanning fiber displays are provided. For example, a scanning fiber display may optionally comprise any of the optical fibers described above and an actuator in mechanical contact with the optical fiber, the actuator for inducing an oscillation of the optical fiber. As an example, an optical fiber in a scanning fiber display may optionally comprise a waveguiding element extending along an axis; a mechanical region surrounding the waveguiding element, such as a mechanical region that is positioned between the waveguiding element and an outer periphery and that comprises a first material having a first density; and a plurality of mass adjustment regions positioned within the mechanical region, such as a plurality of mass adjustment regions that comprise a second material having a second density less than the second density.

Various actuators and actuator configurations are useful with the scanning fiber displays described herein. For example, the actuator optionally comprises a piezoelectric transducer, an electromagnetic voice coil, or a thermal actuator. Optionally, the actuator comprises a two-dimensional actuator for controlling motion of an end of the optical fiber in two dimensions. Useful actuators include those that oscillate at a controllable frequency and may be configured to operate at or about a natural or resonant frequency of an optical fiber.

The disclosed scanning fiber displays may optionally further comprise a visible optical source in optical communication with the waveguiding element of the optical fiber. For example, a multi-color switchable optical source in optical communication with the waveguiding element of the optical fiber may be used. In this way, color images may be output by the scanning fiber display by controlling the light input into the waveguiding element, such as by adjusting a color, or intensity, as a function of the position of the optical fiber.

The foregoing, together with other features and embodiments, will become more apparent upon referring to the following description, claims and accompanying drawings. It will be appreciated that the optical fibers and scanning fiber displays of the above aspects may optionally include features and aspects described in the below description.

DETAILED DESCRIPTION OF SPECIFIC EMBODIMENTS

Figure 1A:
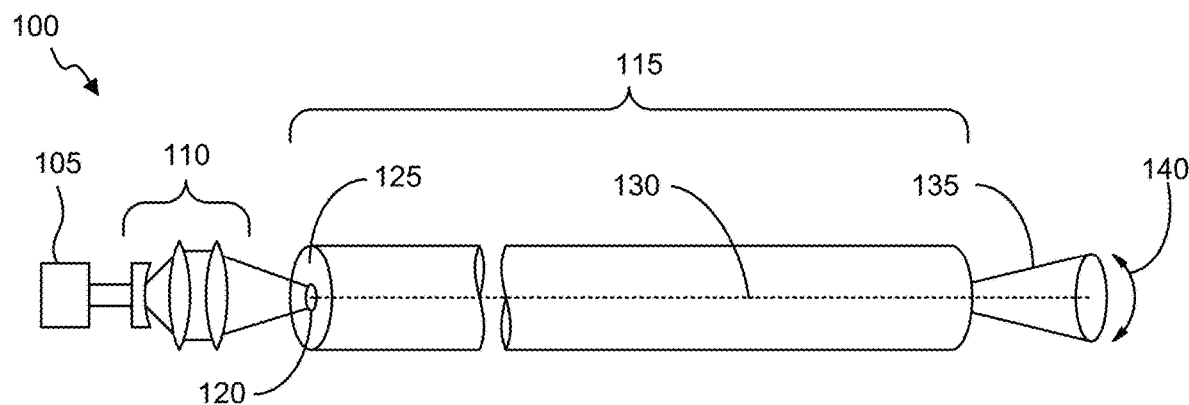
FIG. 1A and FIG. 1B provide schematic illustrations of example optical fiber systems in accordance with some embodiments.

Described herein are embodiments of optical fibers, fiber optic oscillators, and scanning fiber displays. The disclosed optical fibers advantageously provide an improvement to the oscillation amplitude or pointing angle for a fixed oscillation frequency or resonant frequency, such as when compared to fiber optic oscillators having the same fixed oscillation frequency or resonant frequency but making use of a conventional optical fiber.

The disclosed optical fibers possess mechanical characteristics different from those of conventional fibers due to their construction and materials properties. For example, a conventional optical fiber may include a core region and a cladding region to define a waveguiding element. These regions may be solid bodies of optical materials possessing different indices of refraction so as to achieve total internal reflection and waveguiding of an optical beam down an axis of the optical fiber.

The optical fibers disclosed herein, also referred to as microstructured optical fibers, may optionally make use of a similar waveguiding element of materials having different refractive indices, for example, but they also include a mechanical region surrounding the waveguiding element, such as a mechanical region that is not primarily used for waveguiding an optical beam but instead is used to tune, select, or otherwise modify the mechanical properties of the optical fiber, such as to achieve desired mechanical properties. As an example, one or more second moment of area adjustment regions may be included in the mechanical region, which may serve to modify the second moment of area of the optical fiber as compared to an optical fiber that is identical except that it does not include the one or more second moment of area adjustment regions. In a specific example, the second moment of area may be adjusted by modifying the mass of the mechanical region. For example, one or more mass adjustment regions may be included in the mechanical region, which may serve to reduce the mass or mass per unit length of the optical fiber as compared to an optical fiber that is identical except that it does not include the one or more mass reduction regions. Example mass adjustment regions include air-filled regions (or other gas-filled regions) or regions comprising other materials that have a density less than that of a material used for the waveguiding element or the mechanical region. For example, plastics, polymers, or glasses having densities less than the material used in the waveguiding element or the mechanical region may be employed. This reduction in mass, may, for example, allow for optical fibers of desired mechanical properties to be created and used. In addition, the reduction in mass may correspond to modification of the moment of area of the mechanical region.

It will be appreciated that identical optical fibers may refer to two optical fibers having identical geometries, materials, and/or constructions, and reference to an exception between identical optical fibers may indicate that the exception is one characteristic of one fiber that is different from the other fiber, such as one optical fiber being microstructured and one optical fiber not being microstructured. For example, an optical fiber may include a core, such as a core having a first cross-sectional dimension (such as a diameter) and made of a first optical material, and a cladding surrounding the core, such as a cladding having a second cross-sectional dimension (such as an outer diameter) and made of a second optical material. An optical fiber that is identical except that it includes one or more mass adjustment regions, such as air-or-gas filled regions, may refer to a microstructured optical fiber that includes a core, such as a core having the first cross-sectional dimension and made of the first optical material, a cladding surrounding the core, such as a cladding having the second cross-sectional dimension and made of the second optical material, and one or more mass adjustment regions located in the cladding. It will be appreciated that identical optical fibers may have other characteristic differences aside from the mass reduction regions that arise due to the presence of the mass reduction regions, such as different mass per unit length or different resonant frequency for a fixed oscillating fiber length or different oscillating fiber length for a fixed resonant frequency.

It will further be appreciated that identical optical fibers may have slightly different characteristics depending on whether certain attributes are the same between identical optical fibers. For example, two optical fibers that are identical, except for the inclusion of a microstructured mechanical region, and that have a same oscillating length will have different resonant frequencies, such as where the microstructured optical fiber has a higher resonant frequency. As another example, two optical fibers that are identical, except for the inclusion of a microstructured mechanical region, and that have the same resonant frequencies will have different oscillation length, such as where the microstructured optical fiber has a longer oscillation length.

Advantageously, the disclosed optical fibers may provide for an improved field of view of a scanning fiber display for a given scanning frequency. For example, a scanning fiber display that uses a microstructured optical fiber including a mechanical region including one or more mass reduction regions may have an increased field of view as compared to the field of view of a scanning fiber display that uses an identical optical fiber with a same resonant frequency except that it does not include one or more mass reduction regions (i.e., a non-microstructured optical fiber). Since the field of view may be a limiting factor in consumer acceptance of augmented reality devices, increasing the field of view may be beneficial for increasing consumer adoption. It will be appreciated that, in some scanning fiber display embodiments, the field of view may be increased by increasing the length of the oscillating fiber for a given operating frequency, as this will result in an increase in the maximum pointing angle of the oscillating fiber.

FIG. 1A provides a schematic illustration of an example optical fiber system 100. Example optical fiber system includes an optical source 105, coupling optics 110, and optical fiber 115. Optical source 105 may include a light emitting diode, a laser, or other visible optical source, for example. Optical source 105 may optionally include a plurality of sub-sources or a multi-color optical source, such as sources outputting different wavelengths of electromagnetic radiation. In embodiments, optical source 105 may be switchable, such as to allow for control over the output or intensity of the optical source 105 as a function of time.

Coupling optics 110 may include one or more optical elements, such as lenses, mirrors, reflectors, etc., arranged in a configuration to enable light from optical source 105 to be suitably directed into the core 120 of optical fiber 115 for waveguiding. Thus, optical source 105 may be positioned in optical communication with a waveguiding element of optical fiber 115. It will be appreciated that the coupling optics needed to efficiently couple light from optical source 105 may be dependent upon optical source 105 and the geometry, materials, and/or the numerical aperture of the optical fiber 115.

As illustrated, optical fiber 115 includes core 120 and cladding 125 and has an axis 130, which may correspond to an optical axis or a waveguiding axis, for example. Light from optical source 105 that is coupled into core 120 and waveguided along the length of optical fiber 115 may be output at the opposite end of optical fiber 115. It will be appreciated that the spot shape and direction of the light output from optical fiber 115 may be dependent upon the geometry, materials, and/or the numerical aperture of the optical fiber 115. Typically, output from an optical fiber exhibits a cone shape 135, with the angle of the cone 135 again defined by the geometry, materials, and/or the numerical aperture of the optical fiber 115. In terms of field-of-view, optical fiber 115, in a non-oscillatory configuration, exhibits no increase in field-of-view 140 beyond the angle of cone 135. In terms of deflection angle, optical fiber 115, in a non-oscillatory configuration, exhibits a deflection angle of zero.

Figure 1B:
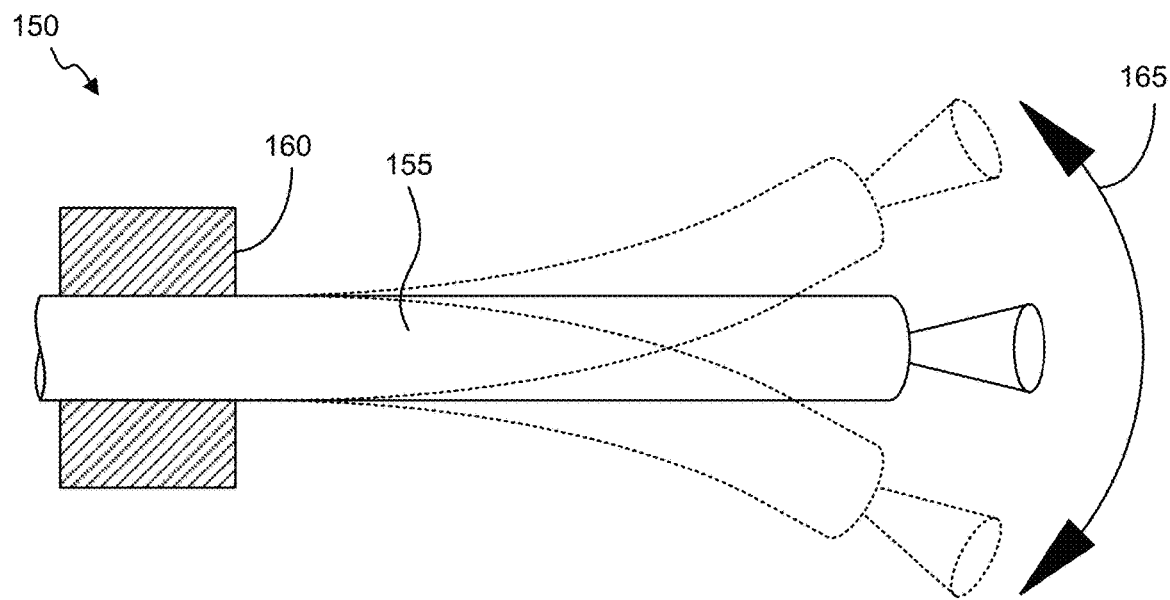

FIG. 1B provides a schematic illustration of an optical fiber system 150, such as may be present in a scanning fiber display system. General details of a scanning fiber display system may be found, for example, in U.S. patent application Ser. No. 14/156,366, filed on Jan. 15, 2014 and published under publication no. US 2015/0268415, which is hereby incorporated by reference in its entirety.

FIG. 1B omits depiction of any optical source or coupling elements from optical fiber system 150 so as not to obstruct other details. Optical fiber system 150 includes optical fiber 155, which may correspond to optical fiber 115, and actuator 160. Actuator 160 may be used to impart oscillatory motion into optical fiber 155. Oscillations of optical fiber 155 may be modeled as or correspond to a cantilevered oscillator with a fixed end and a free end. Actuator 160 may be or include a piezoelectric actuator, an electromagnetic voice coil, or a thermal actuator, for example. Actuator 160 may allow for control over oscillatory motion of optical fiber 155 in two dimensions and may include two or more independent actuatable axes. The extent of the oscillatory motion of optical fiber 155 is depicted with dashed lines in FIG. 1B. Due to the oscillatory motion, optical fiber 155 exhibits an increase in field of view beyond the output cone of optical fiber 155. In terms of field-of-view, optical fiber system 150 exhibits a field-of-view 165 that is greater than the output cone of optical fiber 155.

Figure 2A:
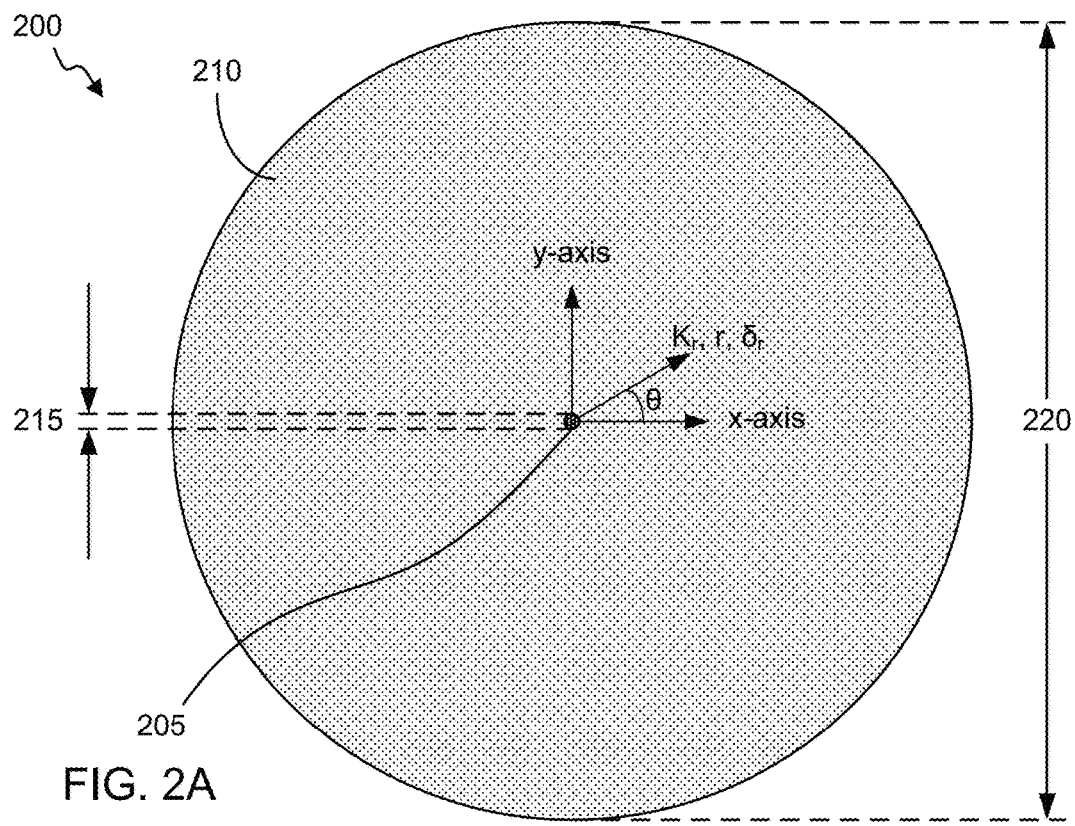
FIG. 2A provides a schematic illustration of a cross-section of an example conventional optical fiber.

FIG. 2A provides a schematic cross-sectional illustration of an optical fiber 200. Optical fiber 200 may correspond to a conventional optical fiber, and includes a core 205 and a cladding 210 surrounding core 205. Core 205 is illustrated as having a core diameter 215 and cladding 210 is illustrated as having an outer diameter 220. It will be appreciated that the core diameter 215 and outer diameter 220 may be characteristic of a particular optical fiber embodiment, and thus may take on any suitable values.

It will be appreciated that, unless otherwise indicated, the dimensions of features illustrated in the accompanying drawings may not be to scale, though certain aspects of a figure or different figures are depicted to illustrate a difference in a dimension between different configurations or elements. It will also be appreciated that additional materials, such as a buffer, jacket, or other coated or protective materials may be constructed outside of the cladding or mechanical region, but may not be shown in the accompanying figures.

Figure 2B:
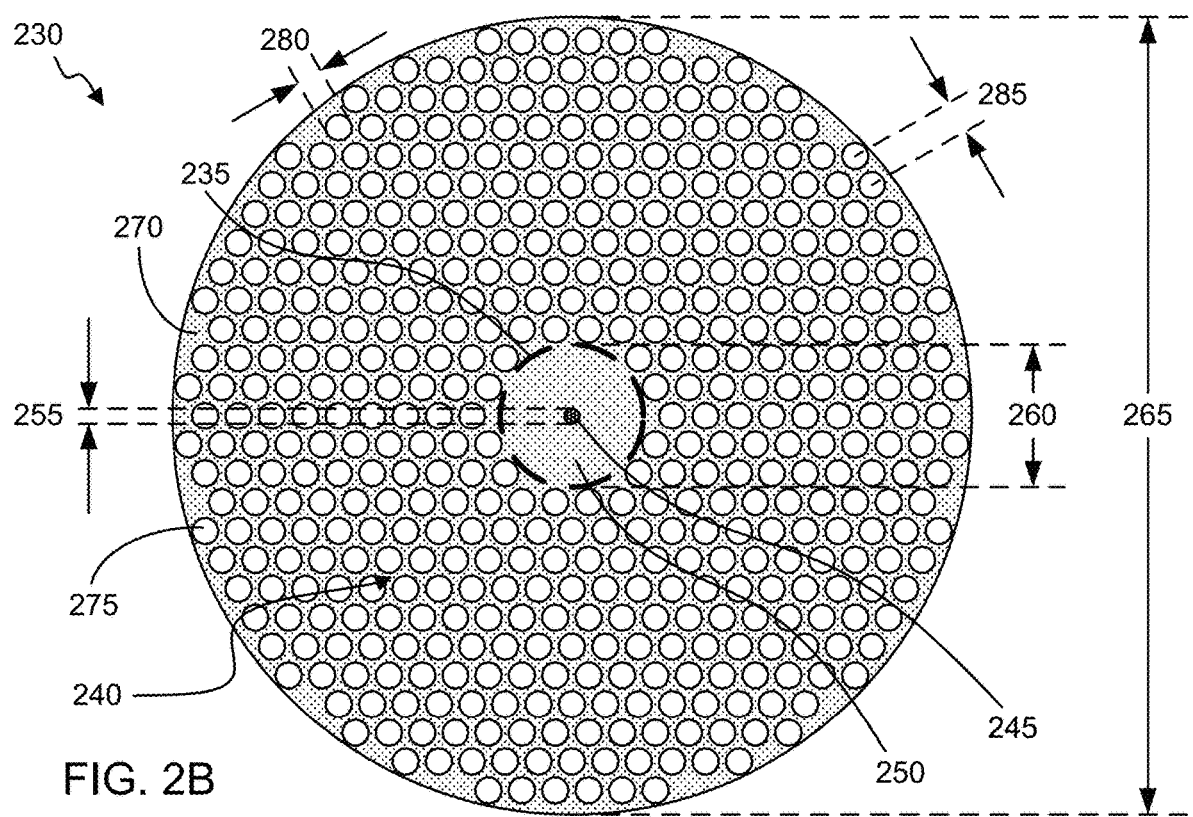
FIG. 2B provides a schematic illustration of a cross-section of an example microstructured optical fiber.
Figure 3A:
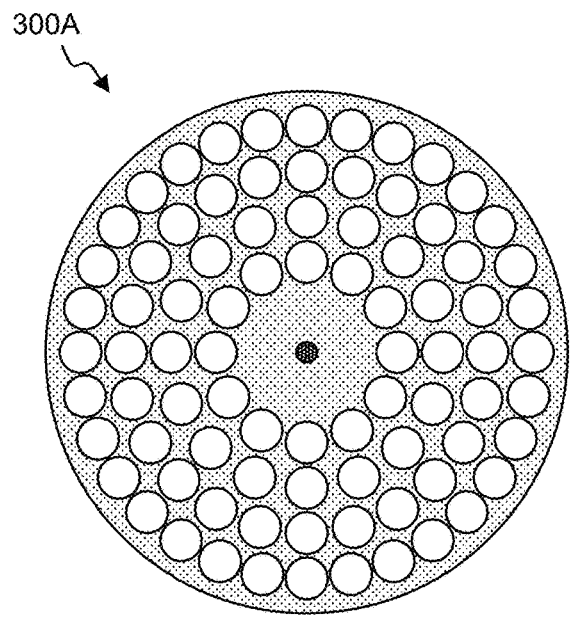
FIG. 3A, FIG. 3B, FIG. 3C, and FIG. 3D provide schematic illustrations of different cross sections for a microstructured optical fiber.
Figure 3B:
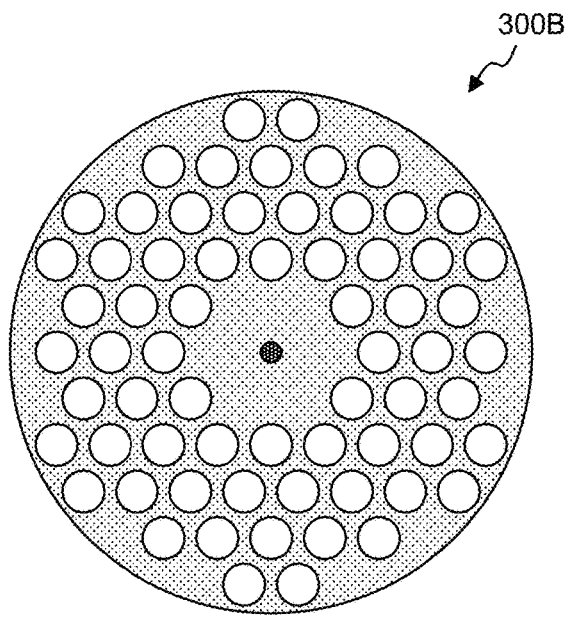
Figure 3C:
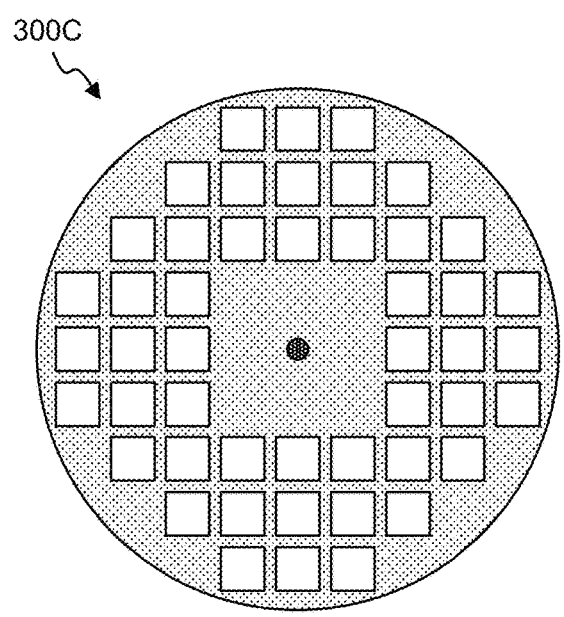
Figure 3D:
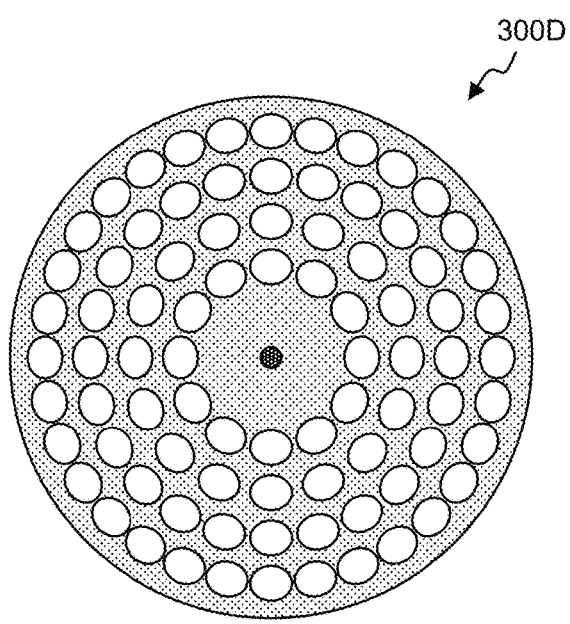

FIG. 2B provides a schematic cross-sectional illustration of an embodiment of a microstructured optical fiber 230. Microstructured optical fiber 230 includes a waveguiding element 235 and a mechanical region 240 surrounding the waveguiding element. For illustration purposes, a dashed line is shown in FIG. 2B to better identify the transition between waveguiding element 235 and mechanical region 240. In FIG. 2B, waveguiding element 235 includes a core 245 and a cladding 250 surrounding core 245. Core 245 is depicted as having a core diameter 255, waveguiding element 235 is depicted as having a cladding diameter 260, and optical fiber 230 is depicted as having an outer diameter 265.

Mechanical region 240 is depicted in FIG. 2B as including solid regions 270 and mass reduction regions 275 positioned between waveguiding element 235 and an outer periphery of mechanical region 240 and microstructured optical fiber 230. Example mass adjustment regions include, but are not limited to, fluid-filled regions, gas- or air-filled regions, polymer-filled regions, glass-filled regions, and/or evacuated regions (e.g., vacuum-filled), with the fluid-, gas- or air-, polymer-, glass-filled, or evacuated regions having a density less than that of solid regions 270, cladding 250, core 245, or any combination of these. Optionally, solid regions 270 comprise the same material as cladding 250 and/or have similar or identical optical and/or mechanical properties. Optionally, solid regions 270 and cladding 250 comprise different materials and or have different optical and/or mechanical properties. It will be appreciated that additional materials, such as a buffer, jacket, or other coated or protective materials may be constructed outside of the outer periphery of mechanical region 240, but are not illustrated here.

Mass reduction regions 275 may be uniformly and/or regularly distributed throughout mechanical region 240 and any suitable or desirable geometries and distribution may be used in order to obtain particular mechanical properties of interest for microstructured optical fiber 230. It will be appreciated that mass reduction regions 275 may be arranged along axes parallel to one another and/or parallel to an axis of the optical fiber, such as a waveguiding axis or an optical axis. Optionally, mass reduction regions 275 may be arranged along other directions, such as along intersecting axes, perpendicular to the optical axis, or angled with respect to the optical axis, however at least a portion of the mechanical region 240 includes mass reduction regions. The mass reduction regions 275 may also be randomly, evenly, or unevenly distributed (optionally along no particular axis) throughout the mechanical region 240. As illustrated in FIG. 2B, mass reduction regions 275 exhibit uniform cross-sections, which are shown as circular and having a diameter 280. Pitch 285 corresponds to the center-to-center spacing between adjacent mass reduction regions 275. Mass reduction regions 275 may exhibit a symmetry, such as a cylindrical symmetry, about an axis of microstructured optical fiber 230, such as a waveguiding axis or optical axis. The optical fiber 230 may optionally exhibit rotational symmetry.

Without limitation, microstructured optical fiber 230 may be constructed by stacking lengths of materials of appropriate sizes to form an overall preform structure targeted for generating microstructured optical fiber 230, such as by using solid tubes and/or hollow tubes of suitable diameters, wall thickness, materials, shape, etc. In some embodiments, glass materials are used. Example glasses may include, but are not limited to silica glasses, fluoride glasses, phosphate glasses, chalcogenide glasses. In some embodiments, plastics or polymers may be used, such as polymethyl methacrylate, polystyrene, fluoropolymers, or polysiloxanes. Depending on the fabrication method and materials, the preform may be placed in a furnace to heat and fuse the different components of the preform and the heated preform may be drawn into a strand of optical fiber. Optionally, extrusion methods may be used, such as for fibers comprising polymer or plastic materials. It will be appreciated that various techniques, materials, and methods may be used to manufacture an optical fiber and a number of commercial fiber manufacturers exist and may provide services for manufacturing optical fibers based on specified parameters.

For illustrative purposes of comparison, core diameter 215 of core 205 of optical fiber 200 may optionally be the same as core diameter 255 of core 245 of microstructured optical fiber 230. Outer diameter 220 of optical fiber 200 may optionally be the same as outer diameter 265 of microstructured optical fiber 230. Core 205 and core 255 may optionally be composed of the same material. Cladding 210 and cladding 250 and solid regions 270 (non-mass reduction regions) of mechanical region 240 may optionally be composed of the same material. In this respect, optical fiber 200 may be considered identical to microstructured optical fiber 230 except that microstructured optical fiber 230 includes mass reduction regions 275, while optical fiber 200 includes a solid cladding 210 that does not include mass reduction regions.

The different components of microstructured optical fiber 230 may take on any suitable dimensions and certain dimensions may be selected to provide particular properties, such as optical properties and mechanical properties. For example, core 245 may have, but is not limited to, a diameter of about 5 µm to about 25 µm. It will be appreciated that the term about, as used herein, is intended to include a variation around a specified value, such as a variation that would not modify the operational effect if the value were slightly smaller or slightly larger. In some embodiments, the term about may relate to a precision or tolerance of a value. In some embodiments, the term about may correspond to a variation of ±1% or less, a variation of ±5% or less, or a variation of ±10% or less.

As another example, the waveguiding element 235 may have, but is not limited to, a diameter of about 5 µm to about 200 µm, such as about 5 µm to about 125 µm. In some embodiments, cladding 250 may have, but is not limited to, a diameter or thickness of about 5 µm to about 200 µm, such as about 5 µm to about 125 µm, and may optionally be considered to encompass or may be integral or a unitary body with mechanical region 240 and thus may have a diameter or thickness corresponding to outer diameter 265. Outer diameter 265 may also take on any suitable value, such as about 10 µm to about 200 µm, and may match the outer diameter 220 of conventional optical fiber 200. Example outer diameters may include about 40 µm, about 50 µm, about 80 µm, about 100 µm, about 125 µm, about 150 µm, about 175 µm, and about 200 µm.

Each of mass reduction regions 275 may take on any suitable dimensions or shapes, and may, for example, have, but is not limited to, a cross-sectional dimension, such as diameter, radius, side length, or axis length, of about 1 µm to about 25 µm, about 1 µm to about 5 µm, about 5 µm to about 10 µm, about 10 µm to about 15 µm, about 15 µm to about 20 µm, or about 20 µm to about 25 µm. Pitch 280 between mass reduction regions 275 may also take on any suitable dimensions, and may be limited by the cross-sectional dimensions of mass reduction regions 275. For example, pitch 280 may be greater than a diameter of mass reduction regions 275. Pitch 280 may have, but is not limited to, a length of between about 1 µm to about 25 µm, about 1 µm to about 5 µm, about 5 µm to about 10 µm, about 10 µm to about 15 µm, about 15 µm to about 20 µm, or about 20 µm to about 25 µm. The mass reduction fraction of optical fiber 230 and/or mechanical region 240 may take on any suitable value based on the size, number, spacing, and arrangement of mass reduction regions. In embodiments, the plurality of mass reduction regions occupy between about 1% and 90% of the volume of optical fiber 230 or of the volume of mechanical region 240. Optionally, the plurality of mass reduction regions occupy between about 30% and about 90%, about 30% or greater, about 40% or greater, about 50% or greater, about 60% or greater, about 70% or greater, about 80% or greater or about 90% of the volume of optical fiber 230 or of the volume of mechanical region 240.

Depending on the particular configuration, in some embodiments, mass reduction regions may exhibit a 4-fold or 6-fold or other symmetry, such as cylindrical symmetry, rotational symmetry, or radial symmetry, about an axis of a microstructured optical fiber. In addition, other cross-sectional shapes for mass reduction regions may be utilized. For example, the cross-section of a mass reduction region may exhibit a polygonal shape, such as a triangle, square, rectangle, hexagon, etc., a round, circular, or oval shape, or any other suitable shape. In some embodiments, the cross-section of a mass reduction region may have shape with a regular symmetry, such as a circle, oval, ellipse, polygon, etc. In embodiments, combinations of different cross-sectional shaped mass reduction regions may be utilized. In embodiments, a spacing between adjacent mass reduction regions may be uniform or non-uniform. In embodiments, the cross-sectional dimensions, such as a diameter, radius, axis length, side length, etc., of different mass reduction regions may be uniform or non-uniform.

FIGS. 3A-3D depict schematic cross-sectional illustrations of different microstructured optical fibers that exhibit a waveguiding element surrounded by a mechanical region in accordance with various embodiments. Microstructured optical fiber 300A in FIG. 3A includes a plurality of rows of mass reduction regions arranged concentrically around the central waveguiding element. Microstructured optical fiber 300B in FIG. 3B includes circular mass reduction regions arranged in a 6-fold symmetric configuration. Microstructured optical fiber 300C in FIG. 3C includes square mass reduction regions arranged in a 4-fold symmetric configuration and a plurality of core regions. Microstructured optical fiber 300D in FIG. 3D includes concentric rings of oval-shaped mass reduction regions.

Although the waveguiding elements of the microstructured optical fibers described above correspond to conventional core/cladding designs, other waveguiding element configurations are possible and contemplated. For example, in some embodiments, multiple core regions may be surrounded by a single cladding layer or region. In addition, multiple optical fibers may be arranged in side-by-side or in a two-dimensional array configuration to provide additive fields-of-view for a scanning fiber display (also referred to as a fiber scanned display). U.S. patent application Ser. No. 14/156,366 describes hexagonally packed multicore fibers, such as including 7 or 19 cores in a hexagonally arranged configuration, as well as arrays of oscillating fibers for a fiber scanned display. It will be appreciated that, in embodiments, a change of refractive index between materials, such as between core and cladding or between glass and air, can provide for a waveguiding effect, such as by the process of total internal reflection. As such, a transition between materials may be all that is needed to achieve waveguiding, and thus the large cladding of a conventional optical fiber may be modified to include mass reduction regions while still retaining a solid central portion surrounding a core of a higher refractive index material that provides for waveguiding. Various fiber configurations are possible, including single-mode configuration and multi-mode configuration. For purposes of generating an optical display, it is beneficial for the optical fiber to have a high transparency/low loss in the visible electromagnetic region.

Figure 4A:
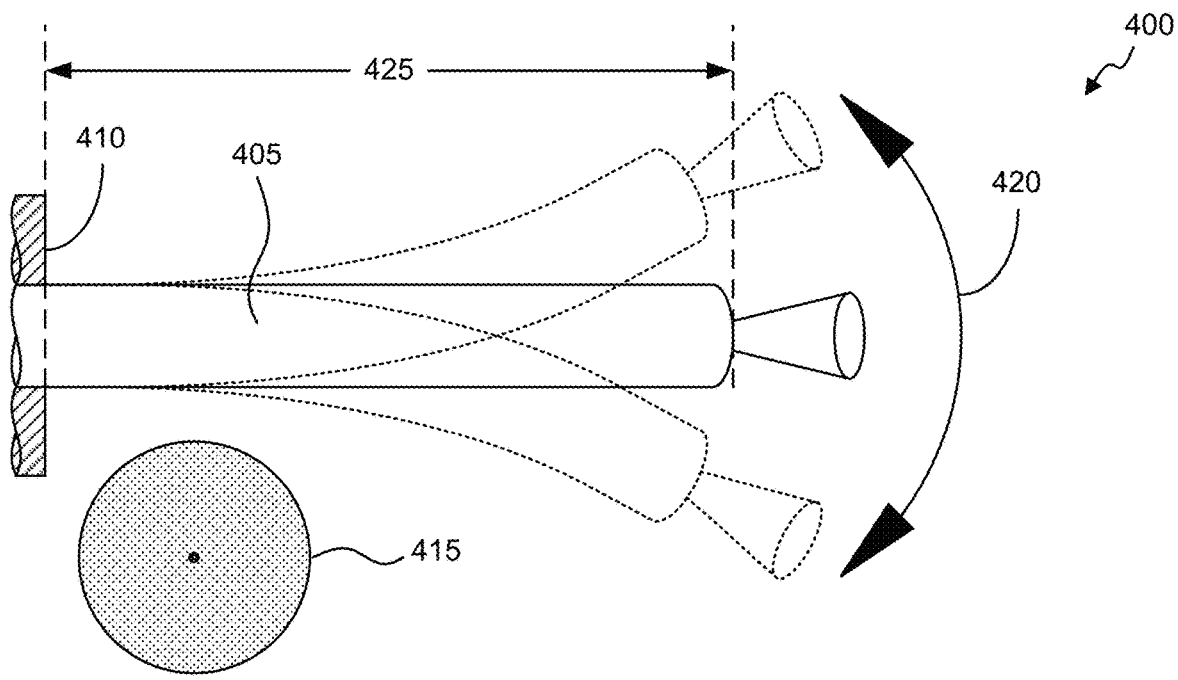
FIG. 4A and FIG. 4B provide schematic illustrations of example optical fiber systems, showing a comparison between using a conventional optical fiber and a microstructured optical fiber.
Figure 4B:
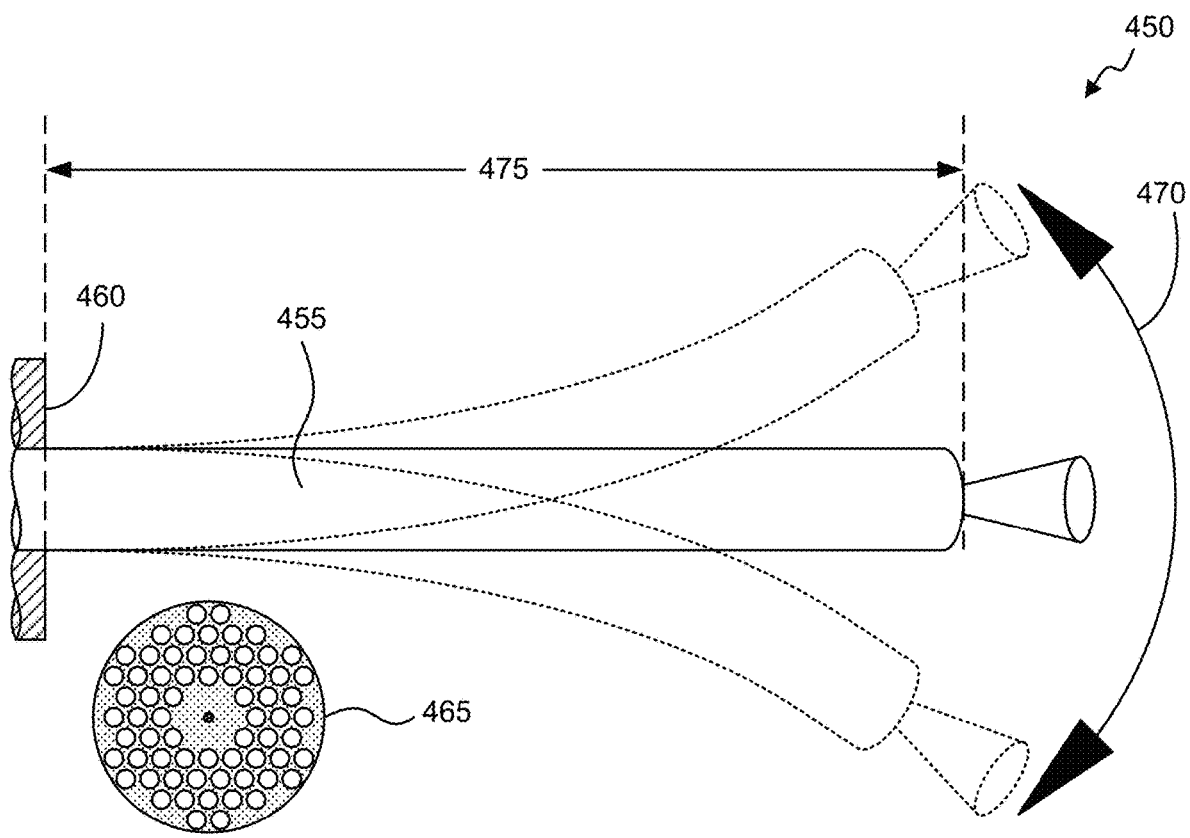

FIG. 4A and FIG. 4B provide schematic illustrations of optical fiber systems 400 and 450 for comparative purposes. Optical fiber systems 400 and 450 may be used, for example, in a scanning fiber display system. FIGS. 4A and 4B omit depiction of any optical source or coupling elements from optical fiber systems 400 and 450 so as not to obstruct other details. In FIG. 4A, optical fiber system 400 includes optical fiber 405 and actuator 410. The cross-section 415 of optical fiber 405 is also shown in FIG. 4A, illustrating that optical fiber 405 is a conventional optical fiber including a core and a cladding layer. Actuator 410 may be used to impart oscillatory motion into optical fiber 405. The extent of the oscillatory motion of optical fiber 405 is depicted with dashed lines in FIG. 4A. In terms of field-of-view, optical fiber system 400 exhibits a field-of-view 420. The cantilevered portion of optical fiber 405 has a length 425.

In FIG. 4B, optical fiber system 450 includes microstructured optical fiber 455 and actuator 460. The cross-section 465 of microstructured optical fiber 455 is also shown in FIG. 4A, illustrating that microstructured optical fiber 465 includes a waveguiding element and a microstructured mechanical region, surrounding the waveguiding element, that includes a plurality of mass reduction regions. Actuator 460 may be used to impart oscillatory motion into microstructured optical fiber 455. Actuator 460 may oscillate at our about at a resonant frequency of microstructured optical fiber 455, such as within 5% of the natural frequency of microstructured optical fiber 455, or within 1% of a resonant frequency of microstructured optical fiber 455. In embodiments, a resonant frequency may correspond to an eigenfrequency or a natural frequency. In embodiments, actuator 460 operates at a frequency that provides a gain in pointing angle or deflection of the microstructured optical fiber 455. The extent of the oscillatory motion of microstructured optical fiber 455 is depicted with dashed lines in FIG. 4B. In terms of field-of-view, microstructured optical fiber system 450 exhibits a field-of-view 470. The cantilevered portion of microstructured optical fiber 455 has a length 475.

It will be appreciated that the resonant frequency of a cantilevered optical fiber may generally be proportional to the square of the length of the cantilever. For example, if the length 425 of optical fiber 405 is doubled, an increase in the resonant frequency of optical fiber 405 by a factor of 4 would be expected. Similarly, if the length 475 of microstructured optical fiber 455 is halved, a decrease in the resonant frequency of microstructured optical fiber 475 by a factor of 4 would be expected.

It will also be appreciated that the distribution of the mass of the cantilevered optical fiber may also impact the resonant frequency. For example, assuming that optical fiber 405 and microstructured optical fiber 455 are identical (diameters, materials, etc.), except for the mass reduction regions of microstructured optical fiber 455, the inclusion of the mass reduction regions may reduce the mass per unit length of microstructured optical fiber 455 as compared to optical fiber 405. Thus, in order for the resonant frequencies of optical fiber 405 and microstructured optical fiber 455 to be the same, optical fibers 405 and microstructured optical fiber 455 will exhibit different lengths, with length 425 being smaller than length 475. Advantageously, this difference in length will allow field-of-view 470 and/or pointing angle of microstructured optical fiber 455 to be greater than the field of view 420 and/or pointing angle of optical fiber 405.

It will be appreciated that other characteristics of an optical fiber may impact the resonant frequency and/or pointing angle, such as maximum pointing angle, of the optical fiber. Example characteristics that may impact a frequency or pointing angle include the fiber outer diameter, the diameter of the waveguiding element, the mass reduction fraction, the quantity, distribution, and cross-sectional dimensions (e.g., diameters) of the mass reduction regions, the pitch between adjacent mass reduction regions, mass reduction region material densities, the waveguiding element design, the core material, the cladding material, the solid material of the mechanical region, and the like.

In some embodiments, a scanning fiber display makes use of the oscillatory motion of a cantilevered optical fiber to project an image using an optical fiber. For example, the oscillatory motion of a cantilevered optical fiber may be controlled in two dimensions to generate a spiral pattern, such as by appropriately driving an actuator. In some embodiments, the input light may be controlled and timed so that the output of the oscillating optical fiber may generate a desired image within the spiral pattern, with repeated oscillatory motion and timed optical outputs used to generate a sequence of images. U.S. patent application Ser. No. 14/156,366 describes how a cantilevered fiber may be used to generate a projected image or sequence of images. The embodiments described herein, however, advantageously allow the field-of-view, pointing angle, and projected output image size and/or resolution of a scanning fiber display to be increased by using a microstructured optical fiber.

Figure 5A:
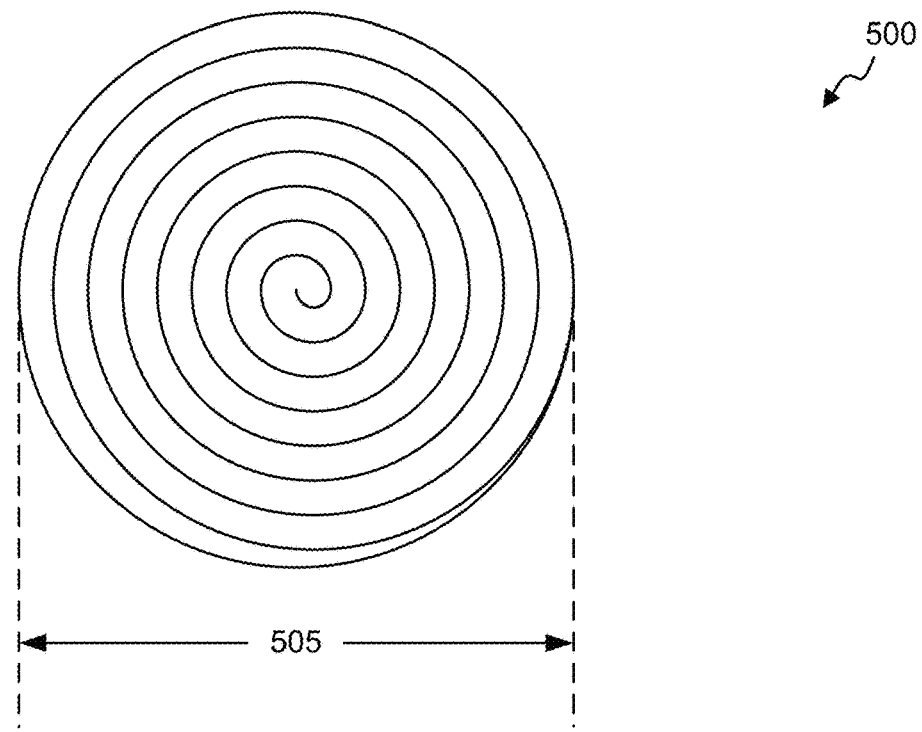
FIG. 5A provides a schematic illustration of a spiral output pattern achieved by a scanning fiber display using a conventional optical fiber.

For example, FIG. 5A depicts a spiral pattern 500 for a conventional scanning fiber display incorporating a conventional optical fiber with a core and cladding and no mass reduction regions in the cladding material, such as similar to optical fiber system 400 of FIG. 4A. The diameter 505 of spiral pattern is limited by the maximum pointing angle of the scanning fiber display used.

Figure 5B:
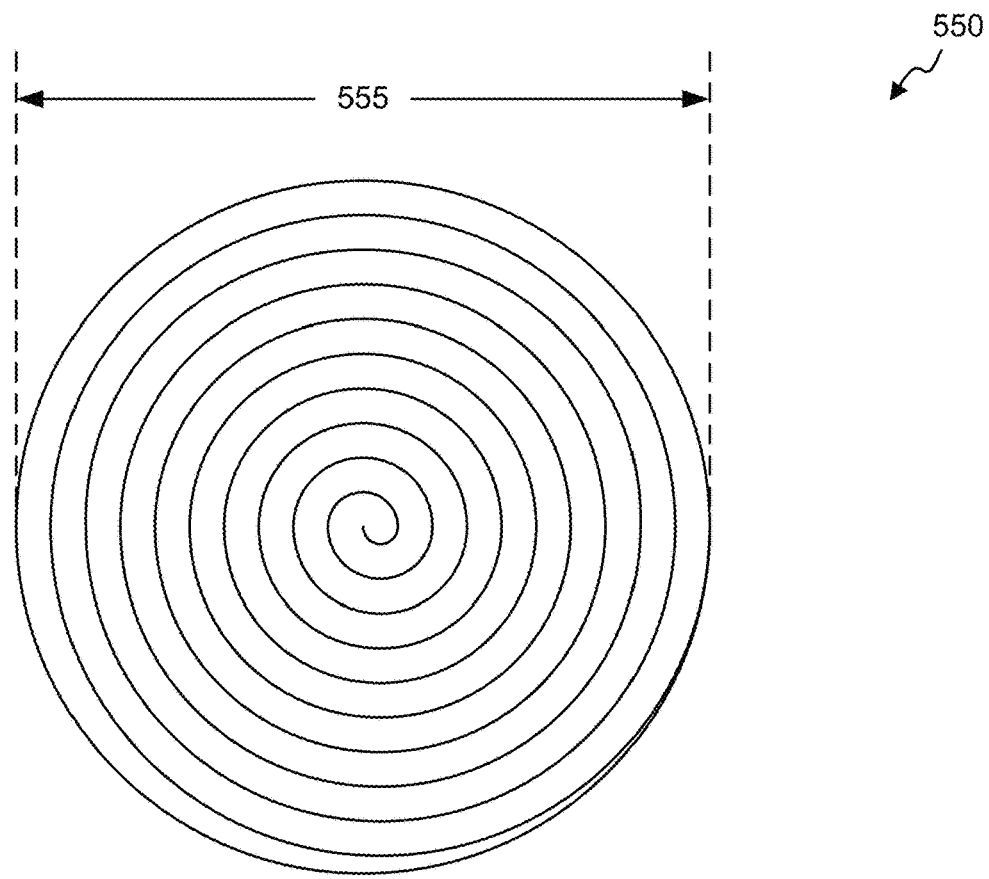
FIG. 5B provides a schematic illustration of a spiral output pattern achieved by a scanning fiber display using a microstructured optical fiber.

In contrast, FIG. 5B depicts a comparable spiral pattern 550 for a scanning fiber display incorporating a comparable microstructured optical fiber including a waveguiding element and a microstructured mechanical region, surrounding the waveguiding element, that includes a plurality of mass reduction regions, such as similar to optical fiber system 450 of FIG. 4B. The spiral pattern 550 exhibits a diameter 555 that is limited by the maximum pointing angle of the scanning fiber display used.

For identical conventional and microstructured optical fibers (i.e., identical except for inclusion of mass reduction regions in the microstructured optical fiber) operating at the same resonant frequency (which implies increased cantilever length), the diameter 555 for spiral pattern 550 will be larger than the diameter 505 for spiral pattern 500, corresponding to the increase in field-of-view and/or maximum pointing angle achieved by use of a microstructured optical fiber. Without limitation, use of a microstructured optical fiber may advantageously increase a field-of-view and/or pointing angle by up to about 30%. In some cases, an increase in field-of-view and/or pointing angle of up to about 50%, or up to about 70% may be achieved. In some embodiments, an increase in field-of-view and/or pointing angle of between about 30% about and 40% may be achieved.

Various microstructured optical fibers may have different optical and mechanical properties. In some embodiments, a microstructured optical fiber may have one or more of the following optical specifications: an optical transmission range of about 435 nm to about 645 nm; an output mode field diameter for red, green, and/or blue light of about 1.4 µm, with a tolerance of about ±0.15 µm; a numerical aperture for red, green, and/or blue light of about 0.25; an optical transmission loss of less than or about 30 dB/km for any or all wavelengths between about 435 and 645 nm; and a low splicing loss to single mode (φ1.2 µm, NA).

In some embodiments, a microstructured optical fiber may have one or more of the following mechanical specifications: an outer diameter of between about 80 µm and about 125 µm or between about 40 µm and about 200 µm; a diameter of the mechanical region of between about 40 µm and the outside diameter; a mass reduction fraction (e.g., gas- or air-filled fraction) in the mechanical region of about 70% or greater; a concentricity core/outer diameter of about 500 nm or less; a percent difference between perpendicular moments of inertia of about 0.4% or less, indicating that the microstructured optical fiber is approximately symmetric in the x and y axes (where z is the fiber length axis); and a weight change due to water collecting in the air-filled regions of about 1% or less.

It will be appreciated that rotational symmetry may be useful for the optical fibers disclosed herein and may be advantageous for some embodiments and thus a microstructured optical fiber may optionally possess rotational symmetry. A rotational symmetry may refer to the stiffness of the optical fiber ($K_r$) being the same in all radial directions ($\theta$) (see FIG. 2A for directional reference). Stated another way, for a force acting along any radial direction, defined by $\theta$, the optical fiber will translate purely in the radial direction. In the static case, Hooke's law gives $F_r = K_r \cdot \delta_r$. With rotational symmetry, it is noted that there is no translation orthogonal to the radial direction. This can also be characterized by stating that the principal directions of the optical fiber are not unique.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure. The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The invention may be further understood by reference to the following non-limiting examples.

Example 1: Description of Mechanical Merit Function: Cantilevered Fiber Optic Oscillator This example describes how to maximize pointing angle, and thus increase field-of-view, at the end of the fiber optic while keeping the natural frequency of the oscillator constant. In some embodiments, this can be accomplished by minimizing the mass of a cantilevered oscillator while maximizing the second moment of area. This example derives: for a given size fiber, how the optimal performance (maximum deflection for a given operating frequency) is achieved for a thin walled tube fiber. Advantageously, microstructured optical fibers incorporating this technology can exhibit a merit function increase (i.e., increase in pointing angle), when compared to an identical traditional fiber, of approximately 30% or better.

To determine the merit function, the second moment of area of a section of optical fiber is needed. The following definitions are used in the calculation of the second moment of area:

$I_{T,MS}$: Second moment of area of cross section (T=standard fiber, MS=Microstructured Fiber)
$A_{T,MS}$: Area of cross-section
$A_{H\_i}$: Area of hole (air-filled region) in microstructure
$r_i$: Perpendicular distance from hole to neutral axis of area section
T: Subscript to indicate solid fiber
MS: Subscript to indicate microstructured fiber
j: Natural frequency mode/harmonic number
$\beta(j)$: Mode constant for $j^{th}$ mode
d: Rod diameter.

For a solid rod, $I_T = d^4/64$. As a constraint, the natural frequency, $f_n$, is fixed to be the same for direct comparison of the solid and microstructured designs. For a cantilevered beam the natural frequency is obtained from the Euler equations:

$$f_n = \frac{1}{2\pi} \beta \cdot L \cdot j^2 \sqrt{\frac{EI}{\rho A L^4}}$$

For high refresh rates of displays, it is useful that the operating frequency of the scanning fiber be high. At the same time, it is desirable to achieve a large deflection of the oscillator as this is proportional to the field of view and resolution.

Since the scanning fiber projector is a resonant device, the operating frequency is about equal to the natural frequency (within 1%). This means that we must choose the system parameters such that the system natural frequency, as estimated by the above equation, remains high.

From the perspective of the micro-structured fiber, the above equation gives direct insight to the effect of I, the second moment of area, and A, the solid cross-section area of solid fiber minus area of holes, on the natural frequency and the associated length of the oscillator.

By inspection of this equation, increasing the ratio of I to A increases the natural frequency. This property can be exploited in microstructured fibers by removing mass near the neutral axis (small effect on I) by inserting holes near the neutral axis, since this has a small effect on I due to being a function of the distance from the neutral axis squared, and keeping mass near the outside diameter or periphery. This further flows from the following equation, where it is shown that the contribution of a section (hole) to the second moment of area is a function of the distance from the neutral axis squared.

From the parallel axis theorem, the second moment of area for the micro-structured fiber is:

$$I_{MS} = I_T - \sum_{i=1}^{N} A_{H\_i} \cdot r_i^2$$

Thus, sections can be deleted (i.e., holes or reduced mass regions inserted) furthest from the neutral axis to boost the natural frequency, or increase the oscillator length, L, for a given natural frequency. Inserting holes allows for boosting the oscillator natural frequency, or increasing the oscillator length (L) for a given natural frequency. Note that all holes have the same effect on the area (A) regardless of their position, while holes nearest the neutral axis boost the natural frequency more than holes that are farther away from the neutral axis The below Merit Function analysis describes how a microstructured fiber compares to a solid fiber in terms of deflection angle. In this analysis, the frequency is held constant and the second moment of area and area of the beam section is varied. The merit function quantifies the gain in the deflection angle. Using the above expression for the natural frequency:

$$f_{n_i} = \frac{1}{2\pi} \beta \cdot L \cdot (n_i)^2 \sqrt{\frac{EI}{\rho A L^4}} = \frac{1}{2\pi} \beta \cdot L \cdot (n_i)^2 \cdot \frac{r_g}{L^2} \sqrt{\frac{E}{\rho}}$$

Solving for the value of L that constrains the frequency to be a constant yields:

$$L^4 = \frac{EI}{A \rho \pi^2 \beta L(n_i)^4 f_n^2} = \frac{I}{A} \cdot \frac{E}{\rho \pi^2 \beta L(n_i)^4 f_n^2}$$

$$L = \sqrt[4]{\frac{I}{A}} \cdot \sqrt[4]{\frac{E}{\rho \pi^2 \beta L(n_i)^2 f_n^2}}$$

Fixing the frequency ($f_n$), density ($\rho$), mode constant ($\beta L(n_i)$) (comparing 1$^{st}$ mode to 1$^{st}$ mode, 2$^{nd}$ mode to 2$^{nd}$ mode, etc.), and modulus (E) constant, the above expression reduces as follows:

$$L = \text{constant} \cdot \sqrt[4]{\frac{I}{A}} \text{ or } L \propto \sqrt[4]{\frac{I}{A}}$$

From the frequency response function, the response at resonance is identified as scaling with the static deflection. Thus, static deflection of beams under point and distributed loads are considered. In each case, the ratio of the deflection of a structured device to the deflection angle of a solid fiber optic cantilever is determined. Note, the pattern of the microstructure can be optimized for max deflection, but it must also be tuned for transmission of visible light with a single mode.

Computing the slope of a beam with concentrated load at end:

$$\alpha = \frac{-FL^2}{2EI}$$

where $\alpha$ is the deflection angle, E is Young's Modulus, I is the second moment of area, L is the cantilever length, and F is force. Computing the slope of a beam with a distributed load $$\alpha = \frac{-WL^3}{6EI}$$

where W is the load per unit length.

The expressions for the angular deflection gains for constant frequency oscillators are derived as follows. For the concentrated force model, assuming $E_{MS}=E_T$:

$$\frac{\alpha_{MS}}{\alpha_T} = \frac{-FL_{MS}^2}{2E_{MS}I_{MS}} \cdot \frac{2E_T I_T}{-FL_T^2} = \frac{L_{MS}^2 I_T}{L_T^2 I_{MS}}$$

$$L^2 \propto \sqrt{\frac{I}{A}} = r_g \ \ L_{MS}^2 \propto \sqrt{\frac{I_{MS}}{A_{MS}}}$$

$$\frac{\alpha_{MS}}{\alpha_T} \approx \sqrt{\frac{I_{MS}A_T}{A_{MS}I_T}} \frac{I_T}{I_{MS}} = \frac{r_{g_{MS}}}{r_{g_T}} \frac{I_T}{I_{MS}} = \sqrt{\frac{I_T A_T}{A_{MS}I_{MS}}}$$

This represents the gain relationship, which allows for calculation using the area and the second moment of area for the sections.

For the distributed force model:

$$L^3 \propto \left(\frac{I}{A}\right)^{\frac{3}{4}} \ \ L_{MS}^3 \propto I_{MS}/A_{MS}^{\frac{3}{4}}$$

$$\frac{\alpha_{MS}}{\alpha_T} \approx \frac{L_{MS}^3}{L_T^3} \frac{I_T}{I_{MS}} = \left(\frac{I_{MS}A_T}{A_{MS}I_T}\right)^{\frac{3}{4}} \frac{I_T}{I_{MS}} = \left(\frac{A_T}{A_{MS}}\right)^{\frac{3}{4}} \left(\frac{I_T}{I_{MS}}\right)^{0.25}$$

This represents the gain relationship, which allows for calculation using the area and the second moment of area for the sections.

Approximating the dynamic mode shape as that of a distributed load for a relative stress calculation:

$$\frac{\sigma_{MS}}{\sigma_T} = \frac{z_{MS}\rho_{MS}A_{MS}L_{MS}^2 I_T}{z_T \rho_T A_T L_T^2 I_T I_{MS}}$$

$$L_{MS}^3 \propto (I_{MS}/A_{MS})^{\frac{3}{4}}, \ L_T^3 \propto (I_T/A_T)^{\frac{3}{4}},$$

$$(L_{MS}^3)^{\frac{2}{3}} \propto \left((I_{MS}/A_{MS})^{\frac{3}{4}}\right)^{\frac{2}{3}},$$

$$L_{MS}^2 \propto (I_{MS}/A_{MS})^{\frac{1}{2}}, \ L_T^2 \propto (I_T/A_T)^{\frac{1}{2}}$$

Assuming that z and p are constant:

$$\frac{\sigma_{MS}}{\sigma_T} \propto \frac{A_{MS}I_T(I_{MS}/A_{MS})^{\frac{1}{2}}}{A_T I_{MS}(I_T/A_T)^{\frac{1}{2}}} \propto \frac{\sqrt{A_{MS}I_T I_{MS}}}{\sqrt{A_T I_{MS} I_T}} \propto \sqrt{\frac{A_{MS}}{A_T}}$$

This indicates that for the same oscillation frequency, the reduced mass fiber has a longer cantilever length.

Figure 6:
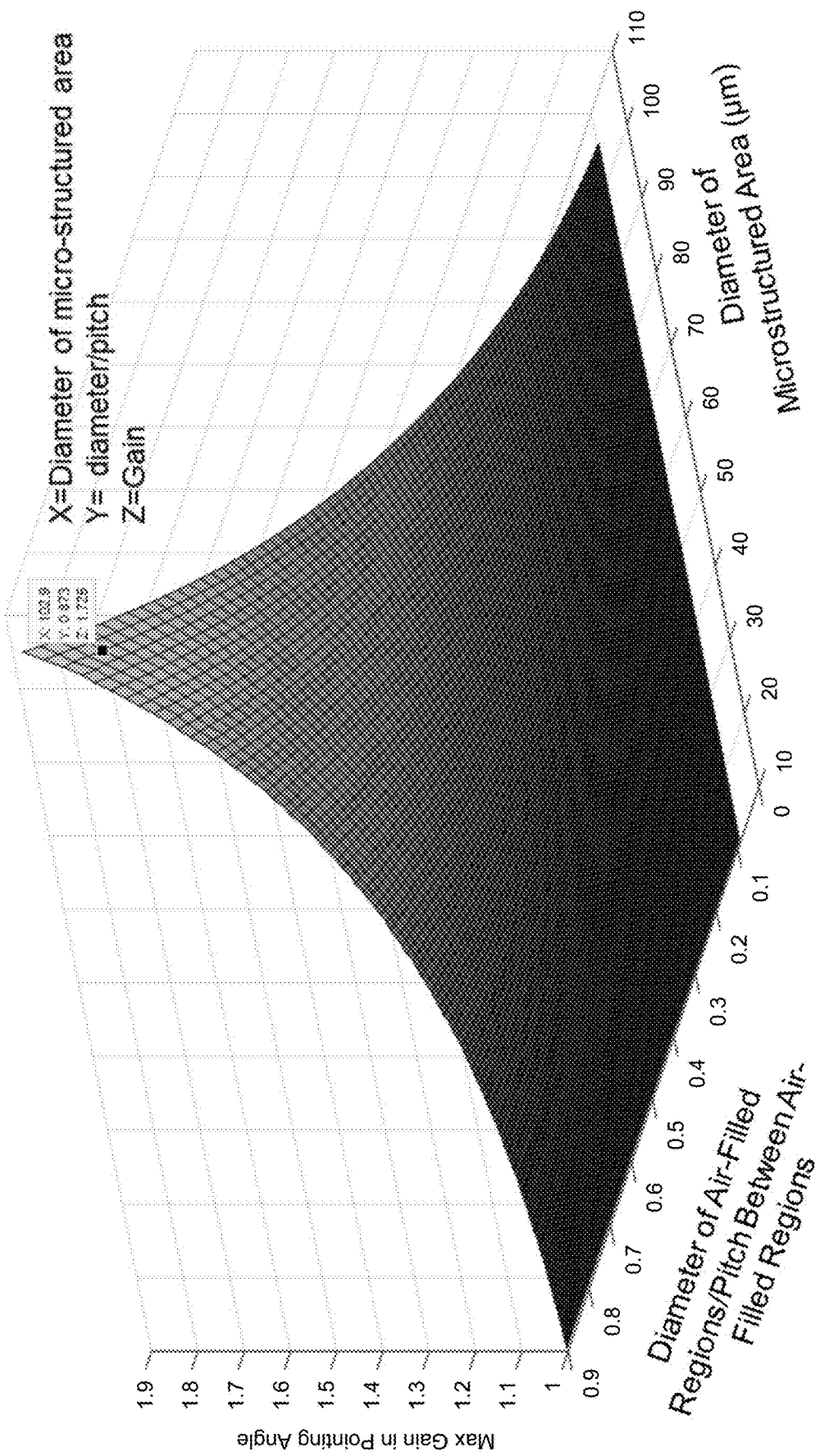
FIG. 6 provides a plot showing gain in pointing angle of an optical fiber as a function of the ratio of diameter to pitch of mass reduction regions and as a function of the diameter of mass reduction regions.

FIG. 6 provides a plot of the merit function showing gain in pointing angle for a microstructured optical fiber over a solid or conventional optical fiber based on a fiber outside diameter of 125 µm based on the above equations. Although this example describes mass reduction in terms of air-filled regions, it will be appreciated that other mass reduction materials may be used under a similar analysis. The plot provides a surface showing maximum gain in pointing angle of an optical fiber as a function of the ratio of diameter to pitch of air-filled regions and as a function of the diameter of air-filled regions, and indicates the effect of the fiber. It will be appreciated that the maximum gain possible is desirable, but certain mechanical considerations must be taken into account. For example, the fiber must be able to oscillate without breaking. As such, the diameter of the microstructured area should be less than the outside diameter of the fiber in order for the fiber to have mechanical integrity. Additionally, the ratio of the diameter of the air-filled regions to the pitch of the air-filled regions should be less than 1, otherwise the air filled regions would overlap and occupy an unusable amount of the fiber. As illustrated in FIG. 6, a diameter of the microstructured (air-filled) region of 102.9 µm, with a diameter/pitch of 0.873 is anticipated to provide a gain of 1.725, which corresponds to a 72.5% increase in pointing angle.

Example 2: Microstructured Fiber Performance Analysis

The requirement for maximizing the natural frequency of a mechanical system is straightforward. For a lumped parameter system, such as a mass connected to a single degree of freedom spring free from damping, the natural frequency, $f_n$ (Hz), is a function of the modal stiffness, $$k\left(\frac{N}{m}\right),$$

and modal mass, m (kg). The natural frequency is $$f_n = \frac{1}{2\pi}\sqrt{\frac{k}{m}} \quad (1)$$

In this case, for given constraints on the problem, there are only two parameters and either the stiffness can be increased or the mass decreased to boost the natural frequency. For a real, continuous system, like the cantilevered beam the fiber scanner illustrated in FIG. 1B (having a modulus E, density ρ, cross-sectional area A, and second moment of area I), the mass distribution, material properties, boundary conditions (holding method for the fiber) and the relationship between beam dimensions, and the operational parameters of the display (field of view, refresh rate, resolution) also should be considered. It is also possible to change the geometry function of the length of the beam. This is done classically in the case of a tapered beam, but is not considered here. Rather, microstructured or photonic bandgap type fibers are examined for their potential benefits. A brief background of oscillators is first provided.

The natural frequency equation for lateral motion of an Euler Bernoulli Beam is $$f_n = \frac{\beta L(i)^2}{2\pi} \sqrt{\frac{EI}{\rho A L^4}} = \frac{\beta L(i)^2}{2\pi} \sqrt{\frac{EI}{(\rho A)L^3}} = \frac{\beta L(i)^2}{2\pi L^2} \sqrt{\left(\frac{E}{\rho}\right)\left(\frac{I}{A}\right)} = \frac{\beta L(i)^2}{2\pi L^2} R_g \sqrt{SM} \quad (2)$$

where:
α: Pointing angle and end of cantilevered fiber
I, $I_{T,MS}$: 2nd moment of area of cross section
T: Subscript for standard, straight, cylindrical fiber
MS: Subscript for micro structured fiber
A, $A_{T,MS}$: Area of cross section of cantilever (constant over length—i.e. no tapered fibers)
$A_{H\_i}$: Area of hole in micro structure (not constant in some designs)
$r_i$: Perpendicular distance from hole to neutral axis
T: Subscript to indicate solid, traditional fiber
MS: Subscript to indicate micro structured fiber
i: Vibrational mode number (e.g. 1st, 2nd, 3rd mode of vibration and natural frequency)
β(i): Mode constant for $i^{th}$ mode, depends on boundary conditions (cantilevered, free, simple support)
D: Oscillator (fiber) outside diameter
d: Oscillator (fiber) inside diameter for a tube
δ: Lateral beam deflection
L: Length of cantilever
E: Young's modulus
ρ: Density
$f_n$: Natural frequency of beam—only consider $1^{st}$ mode
SM: Specific Modulus (or specific stiffness), $$\frac{E}{\rho}$$

$R_g$: Radius of gyration, $$\sqrt{\frac{I}{A}}$$

ξ: Damping ratio of oscillator

The radius of gyration is defined above as $$R_g = \sqrt{\frac{I}{A}} \quad (3)$$

By inspecting Equation 2, the effects of the independent variables on the beam natural frequency can be recognized as follow:
Increasing Young's Modulus (E), increases natural frequency
Increasing second moment of area (I), increases natural frequency
Increasing the density, decreases the natural frequency
Increasing the area of the cross section (A), decreases the natural frequency
Increasing the length (L), decreases the natural frequency
The natural frequency varies linearly with the mode constant (β). This constant is a function of the boundary condition.

Any one or more of the following may be performed to boost the natural frequency.

Modify Boundary Conditions.

Change the wave guide holding methods to increase the constant βL(i). Holding methods are limited by stability requirements, drive energy coupling, and fabrication techniques.

Modify Material Properties.

Increase Young's modulus (E). This is difficult, as optical wave guide materials are limited.

Reduce the density (ρ). This is also difficult, as optical wave guide materials are limited particularly in the context of mass production.

These objectives are combined by introducing the idea of specific modulus or specific stiffness defined as $$\left(\frac{E}{\rho}\right).$$

Thus, it may be desirable to maximize the specific stiffness, though this is limited by commercial materials. This balances change in material properties to allow direct material comparison.

Modify Mass Distribution.

Reduce the cantilever length (L). Although this is possible, such a change may reduce lateral deflection (static deflection for an applied end load is proportional to $L^3$.

Reduce the area of the cross sectional (A). This reduces mass, but also reduces second moment of area (I) and, correspondingly, stiffness.

Increase the second moment of area (I). This increases the natural frequency to the extent that the increase in second moment of area is greater that the increase in area. Boosts the cross sectional area and thus the mass which reduces the natural frequency. Thus, the ratio of I to A is an important factor here $$\left(\frac{I}{A}\right).$$

Thus, it is advantageous to normalize the second moment of area (I) relative to the (A). Recall from Equation 3 that this is the definition of the radius of gyration. This is a useful approach in designing micro-structured oscillators. See Equation 14.

So, as with material properties, it is useful to normalize the mass distribution effect on natural frequency. Advantageously, this is done by the property of radius of gyration which is used to describe the distribution of area about a central axis.

From Equation 2, the proportionality relationships that define the oscillator design trade space (elements dropped from the relationship are constant) may be used. The proportionally relations are used since the relative performance between different oscillator types is of interest. Based on Equation 2:

In terms of the natural frequency of the beam, $f_n$, $$f_n \propto \frac{R_g \sqrt{SM}}{L^2} \tag{4}$$

$$f_n \propto R_g \tag{5}$$

$$f_n \propto \sqrt{SM} \tag{6}$$

$$f_n \propto \frac{1}{L^2} \tag{7}$$

For a fixed frequency, the cantilever length (L) is $$L \propto \sqrt{R_g} \tag{8}$$

$$L^2 \propto \frac{1}{f_n} \tag{9}$$

$$L \propto \frac{1}{\sqrt{f_n}} \tag{10}$$

The frequency gain—between different oscillators—is proportional to the square root of the specific modulus, the radius of gyration (square root of I/A), the boundary constant $$\frac{\beta L(i)^2}{2\pi L^2}$$

and inversely proportional to the square root of the cantilever length.

In the fiber scanner application, it is desirable to simultaneously maximize natural frequency ($f_n$) and lateral deflection ($\delta$). The maximum achievable deflection is identified in Equation 11, where, in general, an increase in natural frequency corresponds to a reduction in lateral deflection. Thus, changes in the length are not always useful in increasing overall system performance without other changes.

Recall that for a quasi-static analysis, the deflection of a cantilevered beam with a distributed load per unit length (w) is $$\delta = \frac{wL^4}{8EI} = \frac{\rho \cdot A \cdot L^4}{8 \cdot E \cdot I} = \frac{L^4}{8 \cdot SM \cdot R_g^2} \tag{11}$$

However, the distributed load is proportional to the cantilever length, ($L^1$), thus the deflection ($\delta$) and the cantilever length are related as $$\delta \propto L^3 \tag{12}$$

Thus, a merit function can be written in terms of the radius of gyration ($R_g$) from equation 8:

$$\delta \propto (R_g)^{\frac{3}{2}} = \left(\frac{I}{A}\right)^{\frac{3}{4}} \tag{13}$$

$$\alpha \propto (R_g)^{\frac{2}{2}} = R_g = \sqrt{\frac{I}{A}} \tag{14}$$

For comparing two oscillators (subscripts 1, 2) with the same natural frequency, the deflection gain is:

$$\frac{\delta_2}{\delta_1} \propto \left(\frac{R_{g_2}}{R_{g_1}}\right)^{\frac{3}{2}} \tag{15}$$

and the pointing angle gain is $$\frac{\alpha_2}{\alpha_1} \propto \frac{R_{g_2}}{R_{g_1}} \tag{16}$$

These merit functions are applied to micro-structured fibers to explore the relative gain expected compared with traditional, untapered fiber optic oscillators.

The radius of gyration for a hollow fiber with outside diameter (D) and inside diameter (d) is:

$$R_{g\_MS} = \frac{\sqrt{D^2 + d^2}}{4} \tag{17}$$

Thus, for micro-structured fiber, the highest value of the radius of gyration is achieved for a thin walled tube.

The radius of gyration for a solid fiber is:

$$R_{g\_T} = \frac{D}{4} \tag{18}$$

Since the natural frequency of an oscillator is proportional to the radius of gyration, this parameter can be maximized for a specified fiber diameter.

The second moment of area is $$I = \frac{\pi}{64}(D^4 - d^4) \tag{19}$$

The cross-sectional fiber area is $$A = \frac{\pi}{4}(D^2 - d^2) \tag{20}$$

To illustrate the gain achieved by microstructured fibers, examples of microstructured sections (limits) based on some common fiber sizes and thin wall tubes are considered. A solid fiber of 125 μm diameter and a simplified model of a microstructured fiber of a 125 μm diameter with a 10 μm wall thickness (inside diameter 105 μm) is considered.

The second moment of area for the solid fiber is $$I_T = \frac{\pi}{64}(125^4 - 0^4) = 12 \cdot 10^6 \ \mu m^4 \quad (21)$$

The cross-sectional area for the solid fiber is $$A_T = \frac{\pi}{4}(125^2 - 0^2) = 12{,}300 \ \mu m^2 \quad (22)$$

The second moment of area of the micro-structured fiber is $$I_{MS} = \frac{\pi}{64}(125^4 - 105^4) = 6 \cdot 10^6 \ \mu m^4 \quad (23)$$

The cross-sectional area for the micro-structured fiber is $$A_{MS} = \frac{\pi}{4}(125^2 - 105^2) = 3{,}610 \ \mu m^2 \quad (24)$$

The radius of gyration ratio is $$\frac{R_{g\_MS}}{R_{g\_T}} = \sqrt{\frac{I_{MS}}{A_{MS}} \frac{A_T}{I_T}} = \sqrt{\frac{6 \cdot 10^6}{3{,}610} \frac{12{,}300}{12 \cdot 10^6}} = 1.31 \quad (25)$$

Using the relative deflection gain from Equation 14, and substituting the result from Equation 23 to get the best-case gain for a 125 μm outside diameter fiber (hollow) with a 10 μm wall thickness, the deflection gain for the micro-structured fiber compared to the solid fiber is $$\frac{\delta_{MS}}{\delta_T} \propto \left(\frac{R_{g_{MS}}}{R_{g_T}}\right)^{\frac{3}{2}} = (1.31)^{\frac{3}{2}} = 1.5 \quad (26)$$

Accordingly, this change results in a ~50% increase in deflection for a given natural frequency and material.

Now, all parameters for the two designs are determined to verify. Solving Equation 2 for the cantilever length:

$$L = \sqrt{\frac{\beta L(i)^2}{2\pi \cdot f_n}} \sqrt{\frac{EI}{\rho A}} \quad (27)$$

Calculating the cantilever length for the solid fiber:

$$L_T = \sqrt{\left(\frac{(1.875104)^2}{2\pi \cdot 25{,}000}\right) \sqrt{\frac{73 \cdot 10^9 \text{Pa} \cdot 12 \cdot 10^6 \mu m^4 \cdot \left(1 \cdot 10^{-6} \frac{m^2}{\mu m^2}\right)^2}{2200 \frac{Kg}{m^3} \cdot 12{,}300 \cdot \mu m^2}}} = \quad (28)$$

2.007 mm

Calculating the cantilever length for the micro-structured fiber:

$$L_{MS} = \sqrt{\left(\frac{(1.875104)^2}{2\pi \cdot 25{,}000}\right) \sqrt{\frac{73 \cdot 10^9 \text{Pa} \cdot 6 \cdot 10^6 \mu m^4 \cdot \left(1 \cdot 10^{-6} \frac{m^2}{\mu m^2}\right)^2}{2200 \frac{Kg}{m^3} \cdot 3{,}610 \cdot \mu m^2}}} = \quad (29)$$

2.293 mm

Verifying the merit function, these results are compared using Equation 8:

$$\frac{L_T}{L_{MS}} \propto \frac{\sqrt{R_{g_T}}}{\sqrt{R_{g_{MS}}}} = \sqrt{1.31} = 1.15 = \frac{2293 \text{ mm}}{2.007 \text{ mm}} \quad (30)$$

Finally, to check the results, the expected deflection is compared for a constant load using the quasi static analysis as a merit function from Equation 24:

$$\frac{\delta_{MS}}{\delta_T} = \frac{L_{MS}^3}{L_T^3} = \frac{(2.293 \text{ mm})^3}{(2.007 \text{ mm})^3} = 1.499 \quad (29)$$

Finally, applying Equation 14 directly based on the radius of gyration ration from Equation 23 provides the deflection gain:

$$\frac{\delta_2}{\delta_1} \propto \left(\frac{R_{g_2}}{R_{g_1}}\right)^{\frac{3}{2}} = (1.31)^{\frac{3}{2}} = 1.499$$

Note that the ~1.5× gain described here is based on an ideal 10 μm wall thickness for a fiber with an outside diameter of 125 μm. In practice, the results for a real fiber with the same dimensions are somewhat less.

Equation 2 may be solved for the length as $$L^2 = \frac{\beta L(i)^2}{2\pi f_n} R_g \sqrt{SM} \text{ or} \quad (30)$$

$$L = \sqrt{\frac{\beta L(i)^2}{2\pi f_n} R_g \sqrt{SM}} = \beta L(i) \sqrt{\frac{R_g(SM)^{0.5}}{2\pi f_n}}$$

From this $$L \propto \sqrt{R_g} = \sqrt[4]{\frac{I}{A}} \text{ and } L \propto \sqrt[4]{SM} = \sqrt[4]{\frac{E}{\rho}} \quad (31)$$

From Equation 31, it is evident that the length is maximized when the ratio of the second moment of area to the area is maximized.

As another example, an solid optical fiber with an outer diameter of 80 μm and a natural frequency of about 60 kHz is considered and compared with a microstructured optical fiber having an overall air fill fraction of about 43.7% (modeled, as above, with a 80 μm fiber with a 10 μm wall thickness) and a natural frequency of about 60 kHz to determine the increase in pointing angle.

The second moment of area for the microstructured fiber is $$I_{TMS} = \frac{\pi}{64}(80^4 - 60^4) = 1.374 \cdot 10^6 \; \mu m^4 \quad (32)$$

The cross-sectional area for the microstructured fiber is $$A_{TMS} = \frac{\pi}{4}(80^2 - 60^2) = 2200 \; \mu m^2 \quad (33)$$

The length for the microstructured fiber is:

$$\quad (34)$$

$$L_{MS} = \sqrt{\left(\frac{(1.875104)^2}{2\pi \cdot 25{,}000}\sqrt{\frac{73 \cdot 10^9 \text{Pa} \cdot 1.374 \cdot 10^6 \mu m^4 \cdot \left(1 \cdot 10^{-6}\frac{m^2}{\mu m^2}\right)^2}{2200\frac{\text{Kg}}{m^3} \cdot 2200 \cdot \mu m^2}}\right)} =$$

1.159 mm

The second moment of area for the solid fiber is $$I_T = \frac{\pi}{64}(80^4 - 0^4) = 2.01 \cdot 10^6 \; \mu m^4 \quad (35)$$

The cross-sectional area for the solid fiber is $$A_T = \frac{\pi}{4}(80^2 - 0^2) = 5025 \; \mu m^2 \quad (36)$$

The length for the solid fiber is $$\quad (37)$$

$$L_T = \sqrt{\left(\frac{(1.875104)^2}{2\pi \cdot 60{,}000}\sqrt{\frac{73 \cdot 10^9 \text{Pa} \cdot 2.01 \cdot 10^6 \mu m^4 \cdot \left(1 \cdot 10^{-6}\frac{m^2}{\mu m^2}\right)^2}{2200\frac{\text{Kg}}{m^3} \cdot 5025 \cdot \mu m^2}}\right)} =$$

1.037 mm

The ratio of the lengths of the microstructured fiber to the solid fiber LMS/LT is 1.12. Using equation 16, the relative increase in pointing angle is $$\frac{\alpha_{MS}}{\alpha_T} \propto \frac{R_{g_{MS}}}{R_{g_T}} = \sqrt{\frac{I_{MS}A_T}{I_T A_{MS}}} = \sqrt{\frac{1.374 \cdot 10^6 \mu m^4 \cdot 5025 \; \mu m^2}{2.01 \cdot 10^6 \mu m^4 \cdot 2200 \; \mu m^2}} = 1.25 \quad (38)$$

Thus, by microstructuring the 80 µm fiber, the pointing angle can be increased by 25%.

Example 3: Example Optical Fiber for Scanning Fiber Display

This example describes a microstructured optical fiber embodiment including multiple mass reduction regions and use of the optical fiber in a scanning fiber display. The microstructured optical fiber is made by stacking lengths of optical silica tubes to form an overall preform structure. A single solid tube of optical material is positioned at the center of the preform and used to correspond to the core of a waveguiding region of the final formed optical fiber. A series of solid silica tubes are positioned around the solid tube in the preform and used to correspond to the cladding layer of the waveguiding region of the final formed optical fiber. Hollow silica tubes are positioned around the series of solid silica tubes in the preform and used to correspond to mass adjustment regions of a mechanical region of the final formed optical fiber. Finally a ring of solid silica tubes are positioned on an outside of the hollow silica tubes and used to correspond to an outer solid edge or periphery of the mechanical region of the final formed optical fiber. The assembled preform is heated to fuse the components to one another and then is drawn into an optical fiber according to known optical fiber drawing techniques.

The resultant optical fiber corresponds to a microstructured optical fiber. The resultant optical fiber has a core region, such as having about a 5 µm diameter core, a cladding region, such as having about a 25 µm outer diameter, and a mechanical region having about an 80 µm diameter. The microstructured optical fiber exhibits an overall air-filled fraction, for example, of about 44%. The microstructured optical fiber exhibits a corresponding reduced mass in the mechanical region as compared to an equivalent non-microstructured optical fiber.

The scanning fiber display is created by positioning the microstructured optical fiber in a cantilevered configuration with respect to a mechanical actuator, such that a length of the microstructured optical fiber is free (i.e., unsupported). The length of the unsupported portion of the microstructured optical fiber is about 1.159 mm. The 1.159 mm cantilevered microstructured optical fiber exhibits a resonant frequency of about 60 kHz. A maximum pointing angle of the microstructured optical fiber when oscillating at the resonant frequency is about 12.5 degrees.

As a comparison, an equivalent non-microstructured (i.e., solid) optical fiber in a cantilevered configuration that has an about 60 kHz resonant frequency (i.e., the same resonant frequency as the above described microstructured optical fiber) is of about 1.037 mm in length and has a maximum pointing angle of about 10 degrees.

What is claimed is:

1. An optical fiber comprising:
   a waveguiding element extending along an axis;
   a mechanical region surrounding the waveguiding element, wherein the mechanical region is positioned between the waveguiding element and an outer periphery, and wherein the mechanical region comprises a first material having a first density; and
   a plurality of hollow or gas-filled regions positioned within the mechanical region, wherein the plurality of hollow or gas-filled regions comprises a plurality of rows of hollow or gas-filled elements and are arranged within the mechanical region such that the optical fiber exhibits a radially symmetric stiffness.

2. The optical fiber of claim 1, wherein the waveguiding element comprises a central core region and a cladding layer surrounding the central core region.

3. The optical fiber of claim 2, wherein the cladding layer comprises the first material, and wherein the central core region comprises a third material.

4. The optical fiber of claim 2, wherein the cladding layer and the mechanical region comprise a unitary body.

5. The optical fiber of claim 1, wherein the waveguiding element comprises a plurality of core regions and a cladding layer surrounding the plurality of core regions.

6. The optical fiber of claim 1, wherein the plurality of hollow or gas-filled regions comprises one or more gas-filled regions, one or more air-filled regions, one or more evacuated regions, or any combination of these.

7. The optical fiber of claim 1, wherein the plurality of rows are arranged concentrically around the waveguiding element.

8. The optical fiber of claim 1, wherein the plurality of hollow or gas-filled regions are arranged in a symmetric configuration around the axis.

9. The optical fiber of claim 1, wherein the plurality of hollow or gas-filled regions are arranged with axes parallel to the axis.

10. The optical fiber of claim 1, wherein the plurality of hollow or gas-filled regions occupy between about 30% and about 90% of a volume of the mechanical region.

11. The optical fiber of claim 1, wherein the plurality of hollow or gas-filled regions reduces a mass of the optical fiber per unit length as compared to a comparable optical fiber comprising a corresponding waveguiding element that is identical to the waveguiding element and a corresponding mechanical region that is identical to the mechanical region except that the corresponding mechanical region does not include hollow or gas-filled regions positioned between the corresponding waveguiding element and a corresponding outer periphery of the comparable optical fiber.

12. The optical fiber of claim 1, wherein the optical fiber has an effective cantilever length, and wherein the plurality of hollow or gas-filled regions increases a resonant oscillatory frequency of the optical fiber as compared to a comparable optical fiber having the effective cantilever length and comprising a corresponding waveguiding element that is identical to the waveguiding element and a corresponding mechanical region that is identical to the mechanical region except that the corresponding mechanical region does not include hollow or gas-filled regions positioned between the corresponding waveguiding element and a corresponding outer periphery of the comparable optical fiber.

13. The optical fiber of claim 1, wherein the plurality of hollow or gas-filled regions increases an effective cantilever length of the optical fiber for a given operating frequency as compared to a comparable optical fiber comprising a corresponding waveguiding element that is identical to the waveguiding element and a corresponding mechanical region that is identical to the mechanical region except that the corresponding mechanical region does not include hollow or gas-filled regions positioned between the corresponding waveguiding element and a corresponding outer periphery of the comparable optical fiber.

14. The optical fiber of claim 1, wherein the optical fiber has a resonant frequency, and wherein the plurality of hollow or gas-filled regions increases an effective cantilever length of the optical fiber as compared to a comparable optical fiber having the resonant frequency and comprising a corresponding waveguiding element that is identical to the waveguiding element and a corresponding mechanical region that is identical to the mechanical region except that the corresponding mechanical region does not include hollow or gas-filled regions positioned between the corresponding waveguiding element and a corresponding outer periphery of the comparable optical fiber.

15. A scanning fiber display comprising:
an optical fiber, wherein the optical fiber includes
a waveguiding element extending along an axis;
a mechanical region surrounding the waveguiding element, wherein the mechanical region is positioned between the waveguiding element and an outer periphery, and wherein the mechanical region comprises a first material having a first density; and
a plurality of hollow or gas-filled regions positioned within the mechanical region, wherein the plurality of hollow or gas-filled regions comprises a plurality of rows of hollow or gas-filled elements and are arranged within the mechanical region such that the optical fiber exhibits a radially symmetric stiffness; and
an actuator in mechanical contact with the optical fiber, the actuator for inducing an oscillation of the optical fiber.

16. The scanning fiber display of claim 15, wherein the actuator comprises a piezoelectric transducer, an electromagnetic voice coil, or a thermal actuator.

17. The scanning fiber display of claim 15, wherein the actuator comprises a two-dimensional actuator for controlling motion of an end of the optical fiber in two dimensions.

18. The scanning fiber display of claim 15, further comprising a visible optical source in optical communication with the waveguiding element of the optical fiber.

19. The scanning fiber display of claim 15, further comprising a multi-color switchable optical source in optical communication with the waveguiding element of the optical fiber.

20. An optical fiber comprising:
a waveguiding element extending along an axis;
a mechanical region surrounding the waveguiding element, wherein the mechanical region is positioned between the waveguiding element and an outer periphery, and wherein the mechanical region comprises silica; and
a plurality of hollow or gas-filled regions positioned within the mechanical region, wherein the plurality of hollow or gas-filled regions comprises a plurality of rows of hollow or gas-filled elements, occupy between about 30% and about 90% of a volume of the mechanical region, and are arranged within the mechanical region such that the optical fiber exhibits a radially symmetric stiffness.

* * * * *